(12) United States Patent
Sadakane et al.

(10) Patent No.: US 12,716,755 B2
(45) Date of Patent: Aug. 25, 2026

(54) ENCODER, SERVO MOTOR, AND SERVO SYSTEM

(71) Applicant: KABUSHIKI KAISHA YASKAWA DENKI, Fukuoka (JP)

(72) Inventors: Kenichi Sadakane, Fukuoka (JP); Ryo Inoue, Fukuoka (JP); Masanobu Kakihara, Fukuoka (JP); Takuya Sato, Fukuoka (JP); Hiroshi Takada, Fukuoka (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 55 days.

(21) Appl. No.: 18/738,417

(22) Filed: Jun. 10, 2024

(65) Prior Publication Data

US 2024/0418546 A1 Dec. 19, 2024

(30) Foreign Application Priority Data

Jun. 16, 2023 (JP) ................................ 2023-099550

(51) Int. Cl.
*G01D 5/347* (2006.01)
*G01D 5/20* (2006.01)

(52) U.S. Cl.
CPC ......... *G01D 5/3473* (2013.01); *G01D 5/2053* (2013.01); *G01D 5/34707* (2013.01)

(58) Field of Classification Search
CPC ............... G01D 5/3473; G01D 5/2053; G01D 5/34707; G01D 5/145; G01D 5/56; G01D 5/58; G01D 2205/26; G01D 5/244; G01D 5/245; G01P 3/487; H02K 11/215
See application file for complete search history.

(56) References Cited

U.S. PATENT DOCUMENTS

2013/0106406 A1* 5/2013 Sugita .................. G01D 5/2451 324/207.25
2013/0140963 A1* 6/2013 Yoshidomi ............. H02K 11/22 310/68 B (Continued)

FOREIGN PATENT DOCUMENTS

CN 113726101 A 11/2021
DE 102005005111 * 10/2005 ............... G01B 7/30

(Continued)

OTHER PUBLICATIONS

An Office Action dated Nov. 8, 2024, issued from the Japan Patent Office (JPO) of Japanese Patent Application No. 2023-099550 (Japanese counterpart application) and EN Machine translation thereof. (6 pages).

(Continued)

*Primary Examiner* — Alvaro E Fortich
(74) *Attorney, Agent, or Firm* — Venjuris, P.C.

(57) ABSTRACT

An encoder includes a rotating body that is rotatable around a rotation axis; a disk that is fixed to the rotating body and has a scale formed in a ring shape; an optical module that is disposed to face the disk and detects the scale; a first magnet that is disposed on one side from the disk in a direction of the rotation axis and fixed to the rotating body; and a first magnetic detector that is disposed on a remaining side from the disk in the direction of the rotation axis and detects magnetism of the first magnet.

13 Claims, 13 Drawing Sheets

(56) References Cited

U.S. PATENT DOCUMENTS

2015/0122980 A1* 5/2015 Yoshida ............. G01D 5/34776 250/231.1
2018/0340800 A1 11/2018 Goto
2019/0310108 A1* 10/2019 Babel ..................... G01D 5/145
2022/0326003 A1 10/2022 Inoue et al.

FOREIGN PATENT DOCUMENTS

| | | | |
|---|---|---|---|
| DE | 102005005111 | A1 | 10/2005 |
| JP | 2005-274249 | A | 10/2005 |
| JP | 2010-210287 | A | 9/2010 |
| JP | 2014-025751 | A | 2/2014 |
| JP | 2020-118594 | A | 8/2020 |
| JP | 2022-161654 | A | 10/2022 |
| WO | 2015/050109 | A1 | 4/2015 |
| WO | 2017/046854 | A1 | 3/2017 |
| WO | 2017/126338 | A1 | 7/2017 |

OTHER PUBLICATIONS

A European Search Report dated Oct. 16, 2024, issued from the European Patent Office (EPO) of European Patent Application No. 24180777.5 (European counterpart application) (33 pages).
An Office Action dated Feb. 25, 2025, issued from the Japan Patent Office (JPO) of Japanese Patent Application No. 2023-099550 (Japanese counterpart application) and EN Machine translation thereof (6 pages).
An Office Action dated Jun. 22, 2026, issued from the Ministry of Intellectual Property (MOIP) of the Republic of Korea of Korean Patent Application No. 10-2024-0077074 (Korean counterpart of the present application) and a EN Machine translation thereof. (16 pages).

* cited by examiner

θ =0°
(FORWARD ROTATION)
0P
S
N
33S2
33N1
31
Ax
17
33N2
33S1
N
S
θ =50°
(FORWARD ROTATION)
0P
33S2
33N2
31
θ
33N1
33S1
θ =140°
(FORWARD ROTATION)
0P
33N2
33S1
31
θ
33S2
33N1
θ =230°
(FORWARD ROTATION)
0P
33S1
33N1
31
θ
33N2
33S2
θ =320°
(FORWARD ROTATION)
0P
33N1
33S2
31
θ
33S1
33N2

θ=0°
0P
(REVERSE ROTATION)
33N1
33S1
N
S
Ax
31
33S2
17
33N2
θ=40°
θ=130°
θ=220°
θ=310°
θ

HYSTERESIS LARGE (±40°)
TRIGGER SIGNAL
READING Ma、Mb
FORWARD ROTATION
REVERSE ROTATION
320
50
140
230
320
50
310
40
130
220
310
40
270
0
90
180
270
0
90
Ma
Hi
Lo
Mb
Hi
Lo

HYSTERESIS SMALL (±10° )
TRIGGER SIGNAL
READING Ma、Mb
FORWARD ROTATION
REVERSE ROTATION
260 315 350 45 80 135 170 225 260 315 350 45
315 10 45 100 135 190 225 280 315 10 45 100
270 315 0 45 90 135 180 225 270 315 0 45 90
Ma
Hi
Lo
Mb
Hi
Lo

ENCODER, SERVO MOTOR, AND SERVO SYSTEM

CROSS-REFERENCE TO RELATED APPLICATIONS

This application is based on and claims priority from Japanese Patent Application No. 2023-099550 filed on Jun. 16, 2023, with the Japan Patent Office, the disclosure of which is incorporated herein in its entirety by reference.

TECHNICAL FIELD

The present disclosure relates to encoders, servo motors, and a servo system.

BACKGROUND

International Publication No. WO 2017/126338 discloses an encoder device that includes a position detection system including a detection unit that detects position information of a moving part, an electric signal generating unit that generates an electric signal due to movement of the moving part, and a battery that supplies at least a portion of the power to be consumed by the position detection system according to the electric signal generated by the electric signal generating unit.

SUMMARY

There is a demand for further miniaturization of encoder devices.

The present disclosure has been made in consideration of the above problems, and is to provide an encoder, a servo motor, and a servo system that can be miniaturized.

To solve the above problem, according to one aspect of the present disclosure, an encoder includes a rotating body that is rotatable around a rotation axis; a disk that is fixed to the rotating body and has a scale formed in a ring shape; an optical module that is disposed to face the disk and detects the scale; a first magnet that is disposed on one side from the disk in a direction of the rotation axis and fixed to the rotating body; and a first magnetic detector that is disposed on the other side from the disk in the direction of the rotation axis and detects magnetism of the first magnet.

Further, according to another aspect of the the present disclosure, a servo motor includes a motor in which a rotator rotates with respect to a stator; and the encoder that detects at least one of position, speed, and acceleration of the rotator.

Further, according to yet another aspect of the the present disclosure, a servo system includes a motor in which a rotator rotates with respect to a stator; the encoder that detects at least one of position, speed, and acceleration of the rotator; and a control device that control the motor based on detection results of the encoder.

The encoder and the like of the present disclosure may be miniaturized.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made without departing from the spirit or scope of the subject matter presented here.

Hereinafter, embodiments will be described in detail with reference to the drawings.

1. Overall Configuration of Servo System

Figure 1:
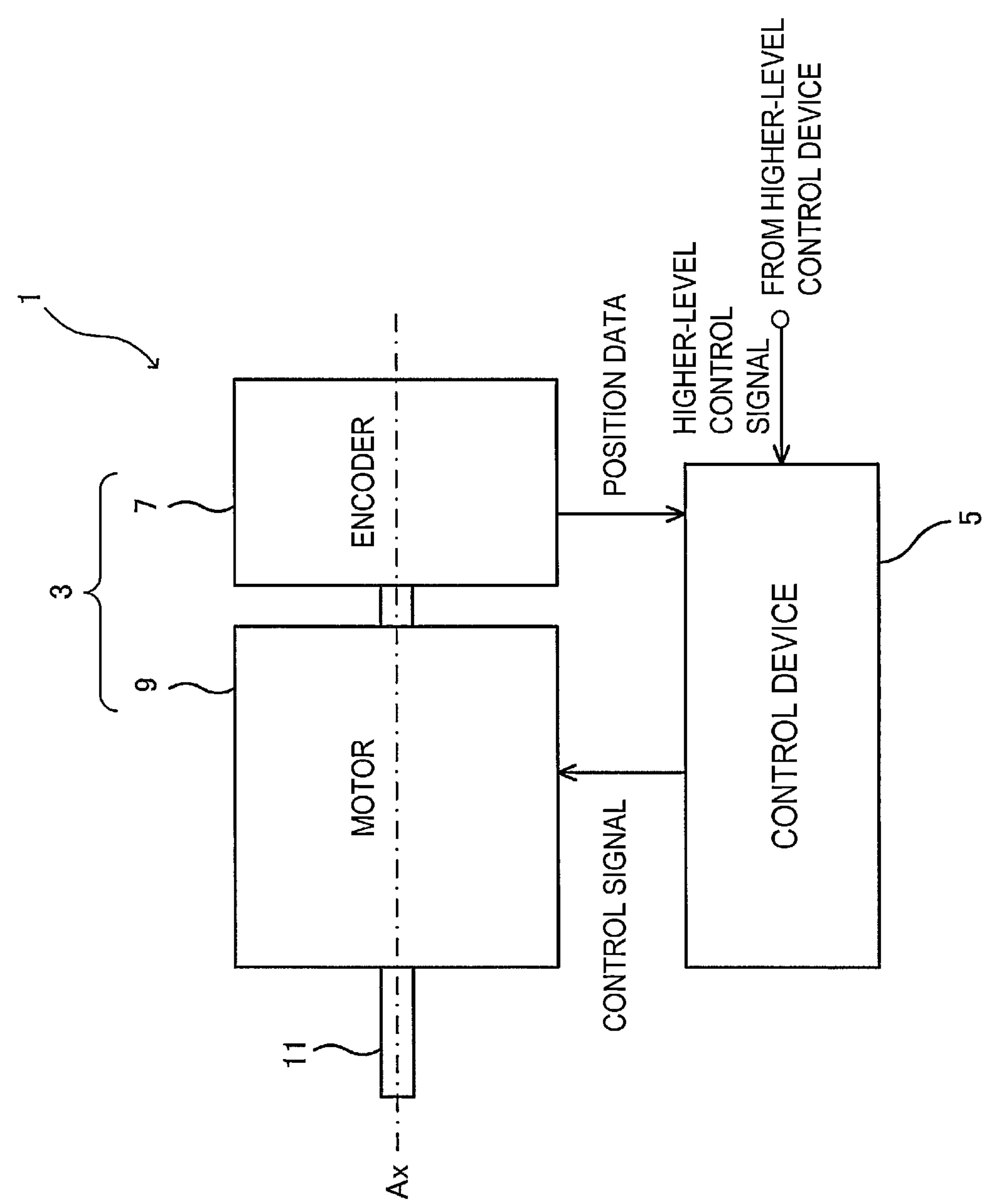
FIG. 1 is an explanatory view illustrating an example of an overall configuration of a servo system.

An example of the overall configuration of a servo system according to an embodiment will be described with reference to FIG. 1. FIG. 1 is an explanatory view illustrating an example of an overall configuration of a servo system.

As illustrated in FIG. 1, a servo system 1 includes a servo motor 3 and a control device 5. The servo motor 3 includes an encoder 7 and a motor 9.

The motor 9 is, for example, a rotary motor in which a rotor (not illustrated) rotates relative to a stator (not illustrated). The motor 9 rotates a shaft 11 fixed to the rotor about a rotation axis Ax. The motor 9 alone may be called a servo motor, but in the embodiment, a configuration including the motor 9 and the encoder 7 is called a servo motor 3.

The encoder 7 is connected to, for example, an anti-load side (right side in FIG. 1) opposite to a load side (left side in FIG. 1) which is a side that outputs the rotational force of the motor 9. However, the encoder 7 may also be connected to the load side of the motor 9. The encoder 7 detects at least one of angular position information indicating the angular position within one rotation of the shaft 11 (rotor) of the motor 9 and multi-rotation information indicating the number of rotations, and outputs position data based on the information. The encoder 7 may detect at least one of the rotation speed and the rotation acceleration in addition to or instead of the angular position of the shaft 11.

The control device 5 controls the current or voltage applied to the motor 9 based on the position data output from the encoder 7, thereby controlling the rotation of the motor 9. The current or voltage applied to the motor 9 is an example of a control signal. The control device 5 controls the motor 9 to achieve the position, speed, torque, etc. represented in a higher-level control signal output from a higher-level control device.

2. Overall Configuration of Servo System

Figure 2:
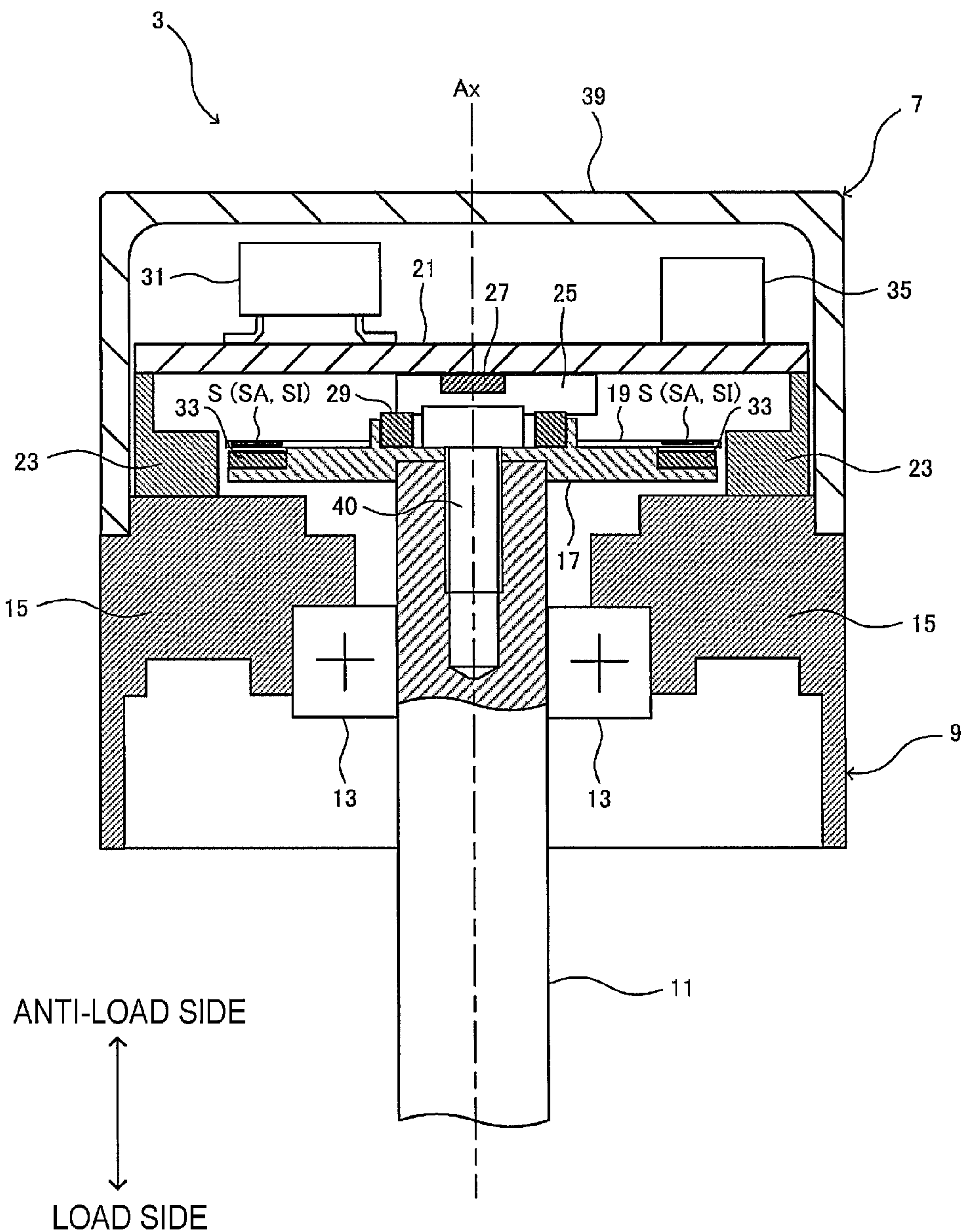
FIG. 2 is a cross-sectional view taken along the line II-II of FIG. 3, illustrating an example of an overall configuration of an encoder.
Figure 3:
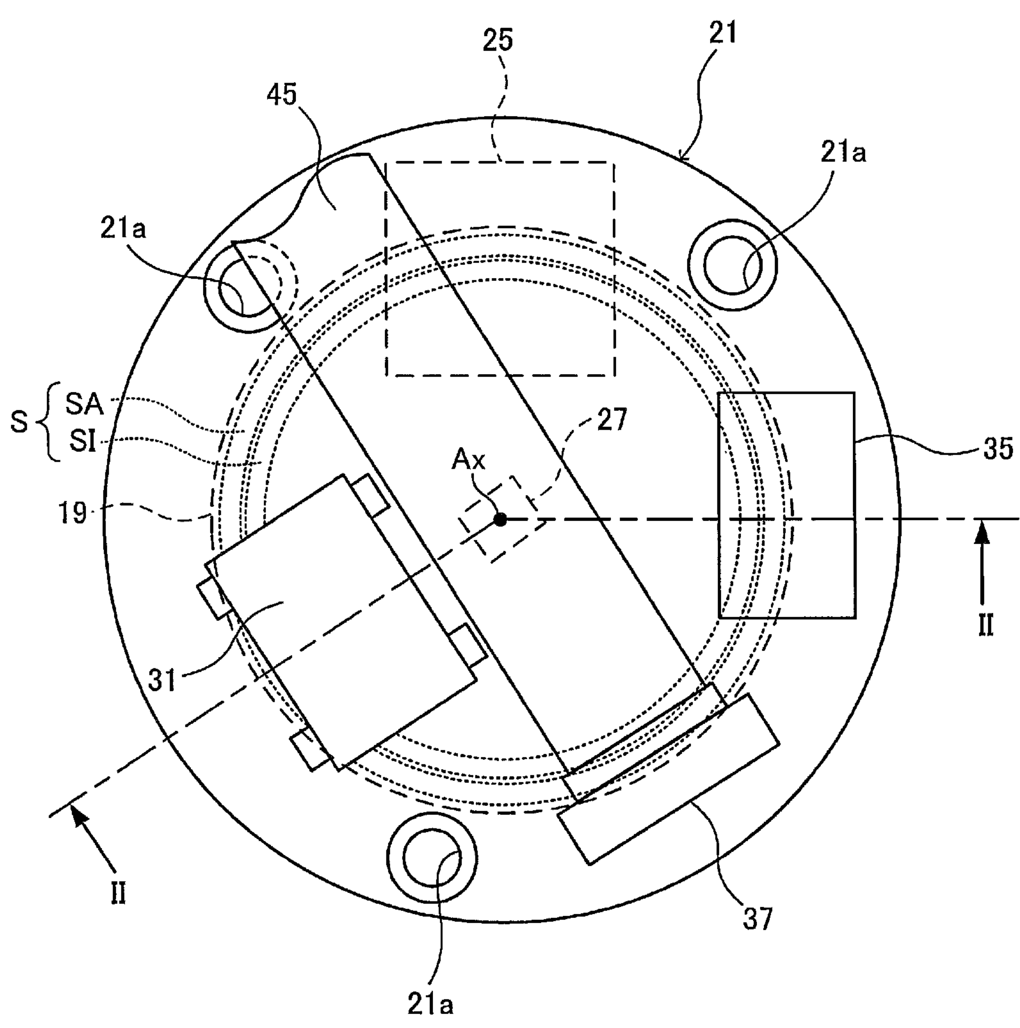
FIG. 3 is a top view of an example of the overall configuration of the encoder as viewed from the substrate side.

An example of the overall configuration of the encoder 7 will be described with reference to FIGS. 2 and 3. FIG. 2 is a cross-sectional view taken along the line II-II of FIG. 3, illustrating an example of the overall configuration of the encoder 7. FIG. 3 is a top view of an example of the overall configuration of the encoder 7, as viewed from the substrate side. In FIG. 2, the cable 45 and the like are omitted as appropriate.

As illustrated in FIG. 2, the servo motor 3 includes the encoder 7 and the motor 9. The motor 9 includes a shaft 11, a bearing 13, and a housing 15. The bearing 13 is fixed to the housing 15 and supports the shaft 11 rotatably around the rotation axis Ax. The motor 9 may include a brake device (not illustrated). The brake device is disposed, for example, between the motor 9 and the encoder 7. The brake device may be disposed on the load side of the motor 9. The brake device may be, for example, an electromagnetic brake of an excitation type that is activated by energizing a brake coil, or an electromagnetic brake of a non-excitation type that is activated when the energization to the brake coil is interrupted.

The lower side in the direction of the rotation axis Ax in FIG. 2 and the rear side of the paper in the direction of the rotation axis Ax in FIG. 3 correspond to the load side, while the upper side in the direction of the rotation axis Ax in FIG. 2 and the front side of the paper in the direction of the rotation axis Ax in FIG. 3 correspond to the anti-load side. The load side is an example of one side in the direction of the rotation axis Ax, and the anti-load side is an example of the other side in the direction of the rotation axis Ax. Further, in the following, the direction of the rotation axis Ax is referred to as an axial direction, the diameter direction centered on the rotation axis Ax is referred to as a radial direction, and the peripheral direction around the rotation axis Ax is referred to as a circumferential direction, as appropriate.

As illustrated in FIGS. 2 and 3, the encoder 7 has a hub 17, a disk 19, a substrate 21, a substrate support member 23, an optical module 25, a magnetic detection unit 27, a magnet 29, a trigger signal generator 31, a magnet 33, a battery 35, a connector 37, and an encoder cover 39.

The hub 17 (an example of a rotating body) is fixed to the end of the shaft 11 on the anti-load side (upper side in FIG. 2) by a bolt 40, and rotates together with the shaft 11 around the rotation axis Ax. The hub 17 may be fixed not to the shaft 11 itself, but to, for example, a small-diameter encoder shaft connected to the shaft 11. The hub 17 is a support member that supports the disk 19, the magnet 29, and the magnet 33. The hub 17 is made of a magnetic material, and is formed to cover the load side of the magnet 29 and the magnet 33. The magnetic material is not particularly limited as long as the material has magnetism, and may be, for example, ferritic or martensitic stainless steel (e.g., SUS416, etc.) or iron. The bolt 40 is made of a non-magnetic material.

The disk 19 is fixed to the anti-load side surface of the hub 17 and rotates together with the shaft 11 around the rotation axis Ax. The disk 19 is made of a non-magnetic material and is an annular member having a circular through hole formed in the center. As an example, the disk 19 may have a complete rotating body shape formed by rotating a predetermined cross-sectional shape around the rotation axis Ax. In this case, the dimensional accuracy is improved, and the disk may be manufactured inexpensively. The disk 19 may be a disk-shaped member without a through hole. The disk 19 is supported by the hub 17 to cover the anti-load side of the magnet 33. The non-magnetic material is not particularly limited as long as the material has no magnetism, and examples of the non-magnetic material include austenitic stainless steel (e.g., SUS304, etc.), aluminum, and glass. A ring-shaped scale S is formed on the anti-load side surface of the disk 19. The scale S has a plurality of slits (not illustrated) arranged in a ring shape along the circumferential direction around the rotation axis Ax. The slits are areas formed on the surface of the disk 19 and have an effect such as reflection of light emitted from a light source 41 (see FIG. 9 described later) of the optical module 25. The scale S has, for example, a scale SA having an absolute pattern and a scale SI having an incremental pattern. The number of scales S formed on the disk 19 may be one, or three or more, as long as the absolute position of the disk 19 can be detected with high accuracy.

The substrate 21 is a printed circuit board in which printed wiring (not illustrated) and a plurality of circuit components are mounted on a plate made of an insulating material. The substrate 21 is disposed on the anti-load side of the disk 19 to face the disk 19. As illustrated in FIG. 3, the substrate 21 is substantially disk-shaped. At a plurality of locations (e.g., three locations) on the outer peripheral side of the substrate 21 in the radial direction, through holes 21*a* for inserting fixing screws (not illustrated) are formed. The substrate 21 is fixed to the substrate support member 23 by fastening the fixing screws to the screw holes of the substrate support member 23 through the through holes 21*a*. Alternatively, the substrate 21 is fixed to the housing 15 together with the substrate support member 23 by fastening the fixing screws to the screw holes of the housing 15 through the through holes 21*a* and the through holes of the substrate support member 23. The substrate 21 is not limited to a single substrate, and may be composed of a plurality of substrates.

The substrate support member 23 is, for example, a cylindrical member that accommodates the hub 17 and the disk 19 therein and supports the substrate 21 substantially parallel to the disk 19. The substrate support member 23 has screw holes or through holes formed at positions corresponding to the through holes 21*a* of the substrate 21. The substrate support member 23 is fixed to the end of the housing 15 of the motor 9 on the anti-load side. The substrate support member 23 may be made of, for example, a plurality of cylindrical members.

Figure 9:
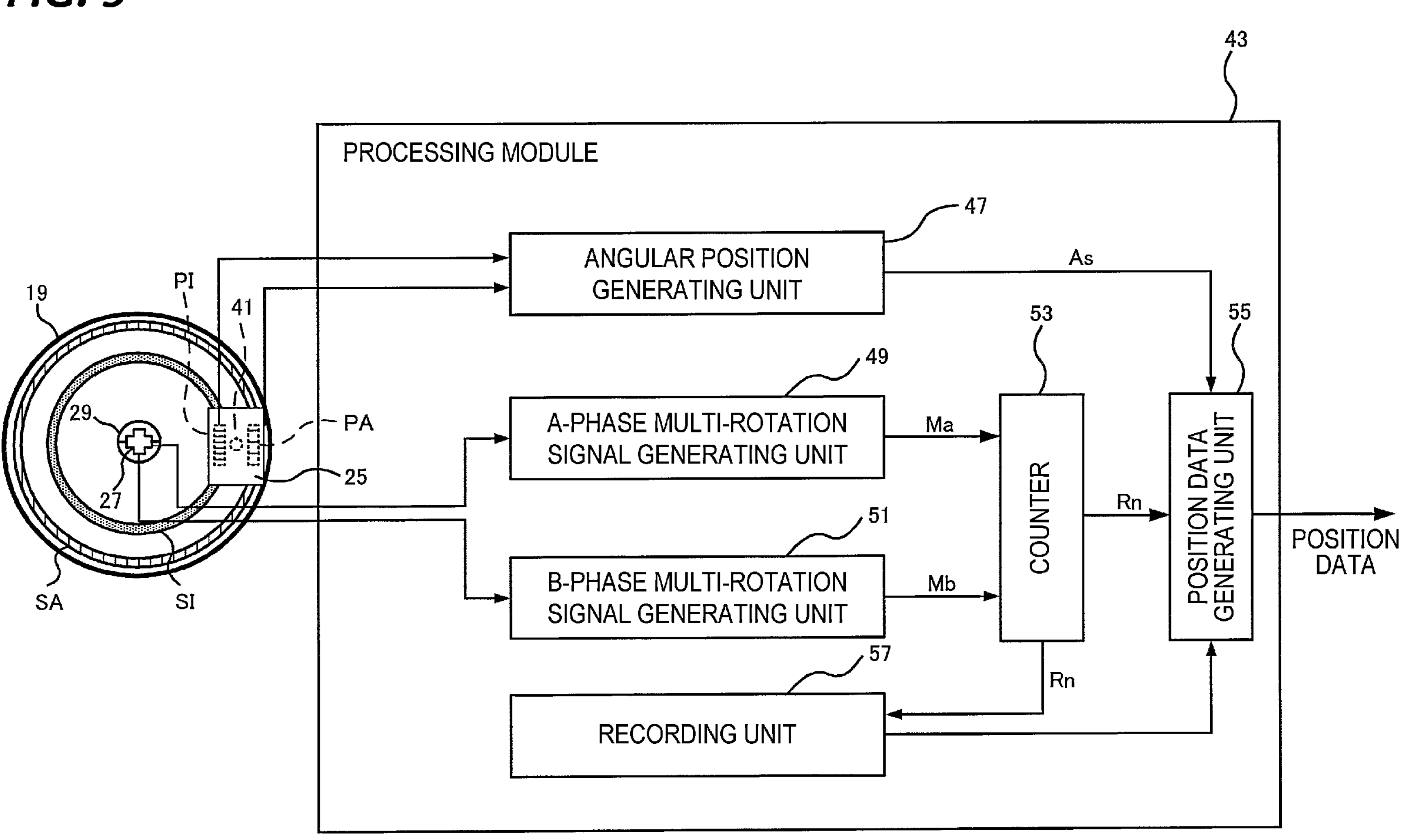
FIG. 9 is a block diagram illustrating an example of a functional configuration of a processing module.

The optical module 25 is disposed on the anti-load side of the disk 19 to face the disk 19. The optical module 25 is disposed, for example, on the surface of the substrate 21 facing the disk 19, i.e., on the load side surface of the substrate 21. As illustrated in FIG. 3, the optical module 25 is disposed to face the scales SA and SI of the disk 19. The optical module 25 detects the scales SA and SI, thereby detecting angular position information indicating the angular position within one rotation of the disk 19. The configuration of the optical module 25 is not particularly limited as long as the angular position information can be optically detected. For example, as illustrated in FIG. 9 described later, the optical module 25 may have a light source 41 and light receiving arrays PA and PI on the surface facing the disk 19. The light receiving array PA receives light reflected by the scale SA of the disk 19 and outputs an absolute signal. The light receiving array PI receives light reflected by the scale SI of the disk 19 and outputs an incremental signal. The optical module 25 is a so-called reflective optical module in which the light source 41 and the light receiving arrays PA and PI are arranged on the same side (e.g., the anti-load side) with respect to the disk 19.

The magnetic detection unit 27 (an example of a second magnetic detector) detects the magnetism of the magnet 29, thereby detecting multiple rotation information indicating the number of rotations of the disk 19. The magnetic detection unit 27 is disposed, for example, on the surface of the substrate 21 facing the disk 19, i.e., on the load side surface of the substrate 21. The magnetic detection unit 27 is disposed, for example, on the rotation axis Ax to face the magnet 29. The configuration of the magnetic detection unit 27 is not particularly limited as long as the multiple rotation information of the disk 19 can be magnetically detected. Examples of the magnetic detection unit 27 include a magnetic resistance element such as an MR element, a GMR element, or a TMR element, a Hall element, and a magnetic impedance element. The magnetic detection unit 27 may be configured, for example, as a single element capable of outputting a two-phase multiple rotation signal having a predetermined phase difference (e.g., 90 degrees). Further, a configuration may be used in which a plurality of elements each outputting a single-phase multiple rotation signal is arranged at an angle that results in a predetermined phase difference.

Figure 4:
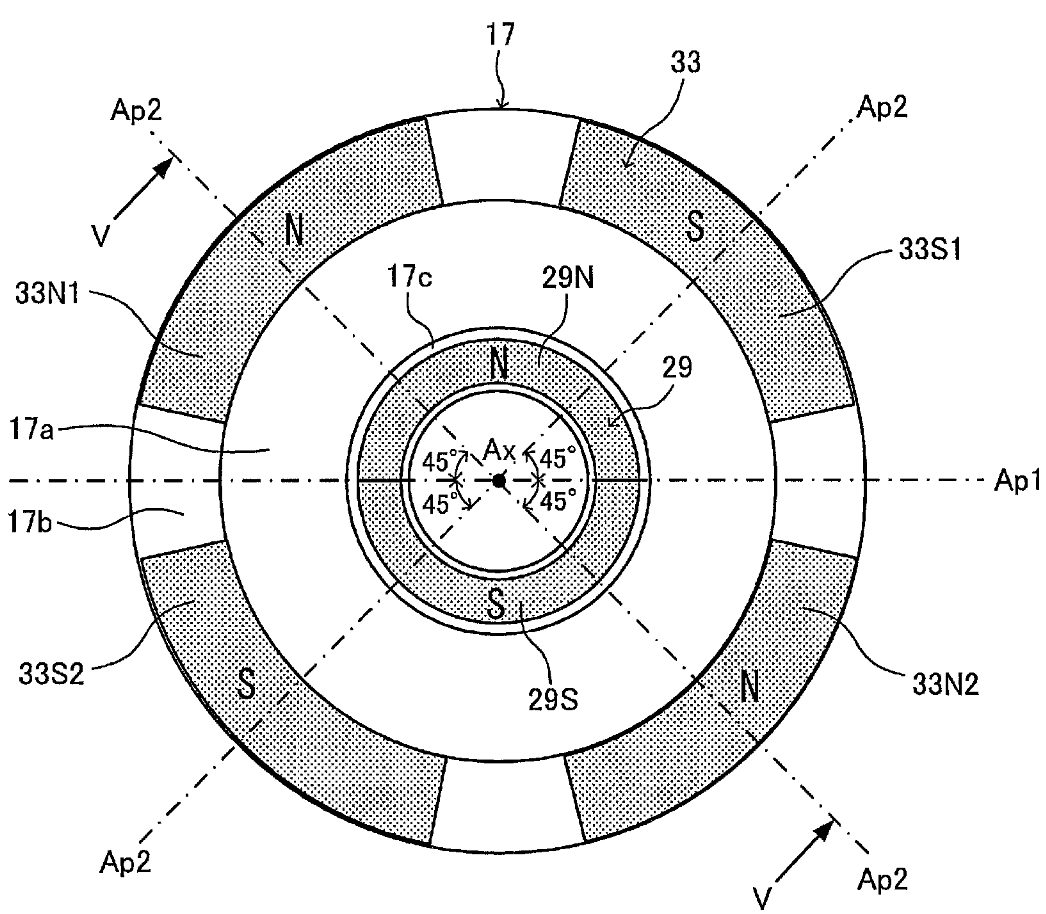
FIG. 4 is a plan view of a hub viewed from the substrate side, illustrating an example of an arrangement of magnets.

The magnet 29 (an example of a second magnet) is fixed to the surface of the hub 17 facing the magnetic detection unit 27, that is, the anti-load side surface of the hub 17. The magnet 29 is arranged, for example, on the rotation axis Ax. The expression "arranged on the rotation axis Ax" does not only mean a case where a portion of the magnet 29 is located on the rotation axis Ax, but also includes a case where the rotation axis Ax passes through a hollow portion of the magnet 29 when the magnet 29 is ring-shaped. The configuration of the magnet 29 is not particularly limited as long as the direction of the magnetic flux detected by the magnetic detection unit 27 is reversed every time the disk 19 rotates approximately 180 degrees. For example, as illustrated in FIG. 4 described later, the magnet 29 may be magnetized such that an N pole and an S pole are formed in the radial direction of the disk 19. In FIG. 4, the portion of the magnet 29 with the N pole on the anti-load side is illustrated as 29N, and the portion with the S pole on the anti-load side is illustrated as 29S. The magnet 29 is formed, for example, in a ring shape. The magnet 29 may be formed, for example, in a disc shape, or the magnet 29 may be made of, for example, two magnets having an N pole and an S pole, respectively. The magnetic detection unit 27 detects the direction of the magnetic flux of the magnet 29, and outputs a multi-rotation signal that changes one period when the disk 19 rotates once, as two A-phase signal and B-phase signal whose phase is 90 degrees different from each other.

The trigger signal generator 31 (an example of a first magnetic detector) detects the magnetism of the magnet 33, and generates a trigger signal (an example of a first electric signal) that serves as a trigger to supply power from the battery 35 to the magnetic detection unit 27 based on the detection of the magnetism of the magnet 33. As illustrated in FIG. 2, the trigger signal generator 31 is disposed on the anti-load side from the disk 19. The trigger signal generator 31 is disposed, for example, on the surface of the substrate 21 opposite to the disk 19, that is, on the anti-load side surface of the substrate 21. The trigger signal generator 31 detects the magnetism of the magnet 33 that has passed through the disk 19 and the substrate 21. The configuration of the trigger signal generator 31 is not particularly limited as long as a trigger signal can be periodically generated by the rotation of the disk 19. For example, the trigger signal generator 31 may be configured to have a magnetic element 31*a* (see FIG. 7 described later) that generates a Large Barkhausen effect and a coil 31*b* (see FIG. 7 described later). The "Large Barkhausen effect" is a phenomenon in which the magnetization direction of the magnetic element 31*a* is suddenly reversed when the strength of the applied external magnetic field exceeds a certain strength, and is also called a Large Barkhausen jump. In this configuration, the trigger signal generator 31 outputs a trigger signal, for example a pulse signal, from the coil 31*b* when the Large Barkhausen effect occurs. The trigger signal generator 31 is disposed such that at least a portion thereof is located on the rotation trajectory of the magnet 33 when viewed from the anti-load side in the axial direction (see FIG. 8 described later).

The magnet 33 (an example of a first magnet) is disposed on the load side from the disk 19 and fixed to the hub 17. The magnet 33 is fixed, for example, to a surface of the hub 17 facing the trigger signal generator 31, i.e., to a surface on the anti-load side of the hub 17. The configuration of the magnet 33 is not particularly limited as long as the magnetic field applied to the magnetic element 31*a* of the trigger signal generator 31 is periodically reversed by the rotation of the disk 19. For example, as illustrated in FIG. 4 described later, four magnets 33N1, 33S1, 33N2, and 33S2 may be arranged at approximately 90 degree intervals in the circumferential direction so that the magnetic poles are alternately different. In FIG. 4, the magnets 33 with N-poles on the anti-load side are illustrated as 33N1 and 33N2, and the magnets 33 with S-poles on the anti-load side are illustrated as 33S1 and 33S2. The trigger signal generator 31 generates four trigger signals by using the four magnets 33N1, 33S1, 33N2, and 33S2 for each rotation of the disk 19. The number of magnets 33 is not limited to four, and may be any even number other than four.

The battery 35 supplies power to the magnetic detection unit 27 (an example of at least a portion of the circuits of the substrate) when external power is not supplied to the encoder 7. In addition to the magnetic detection unit 27, the battery 35 may supply power to other circuits of the substrate 21. The battery 35 does not supply power directly to the magnetic detection unit 27, but supplies power via a processing module 43 (see FIG. 9 described later). That is, the battery 35 is a power supply source for supplying power to the magnetic detection unit 27 when no external power is supplied to the encoder 7. The battery 35 may be a secondary battery that may be used repeatedly by charging. The battery 35 may be, for example, an all-solid-state battery having a solid electrolyte. The battery 35 is disposed, for example, on the surface of the substrate 21 opposite to the disk 19, that is, on the anti-load side surface of the substrate 21. The battery 35 is electrically connected and mechanically fixed to the substrate 21, for example, by soldering.

When external power is supplied to the encoder 7, the processing module 43 generates position data of the disk 19 based on the angle position information and the multiple rotation information. When external power is not supplied to the encoder 7, the processing module 43 controls switching between supplying and stopping power from the battery 35 to the magnetic detection unit 27. The processing module 43 is disposed, for example, on the surface of the substrate 21 opposite to the disk 19, that is, on the anti-load side surface of the substrate 21 (not illustrated in FIGS. 2 and 3). The processing module 43 may also be disposed on the load side surface of the substrate 21. The configuration of the processing module 43 is not particularly limited, and may be configured as a processor having a plurality of circuit elements such as a CPU and a memory.

The connector 37 is disposed, for example, on the surface of the substrate 21 opposite to the disk 19, that is, on the anti-load side surface of the substrate 21. A cable 45 is connected to the connector 37, and the encoder 7 outputs the generated position data to the outside via the cable 45. The cable 45 is, for example, a lead wire. As illustrated in FIG. 3, the cable 45 is routed through a space between the trigger signal generator 31 and the battery 35. The cable 45 is routed to pass over, for example, the rotation axis Ax. The trigger signal generator 31 and the battery 35 are arranged such that a wiring space for the cable 45 is formed therebetween. For example, the trigger signal generator 31 is arranged on one side of the rotation axis Ax, and the battery 35 is arranged on the other side of the rotation axis Ax. At least one of the trigger signal generator 31 and the battery 35 may be arranged to be approximately parallel to the wiring direction of the cable 45. In the example illustrated in FIG. 3, for example, the trigger signal generator 31 is arranged to be approximately parallel to the wiring direction of the cable 45.

The encoder cover 39 accommodates the respective components of the encoder 7 described above. The encoder cover 39 is fixed to an end of the housing 15 of the motor 9 on the anti-load side. The encoder cover 39 has an external connector (not illustrated). One end of a cable 45 is connected to the connector 37 of the substrate 21, and the other end is connected to the external connector of the encoder cover 39.

The configuration of the encoder 7 described above is an example, and is not limited to the above. For example, the hub 17 may be made of a non-magnetic material and formed not to cover the load side of the magnet 33. In that case, for example, the magnet 33 may be disposed on the load side surface or on the radially outer side of the hub 17. Further, the disk 19 may be made of a magnetic material and formed not to cover the anti-load side of the magnet 33. In that case, for example, the magnet 33 may be fixed to the hub 17 so as to be located on the outer periphery side of the disk 19. Further, the magnetic detection unit 27 may be disposed on the anti-load side surface of the substrate 21, and the trigger signal generator 31 or the battery 35 may be disposed on the load side surface of the substrate 21.

3. Configuration of Magnet

Figure 5:
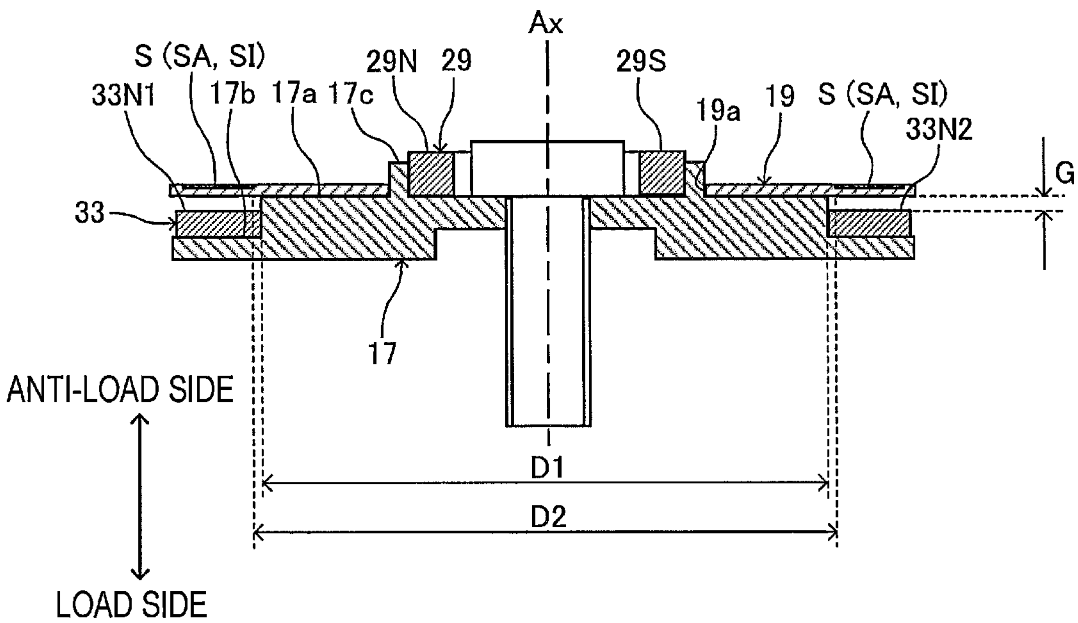
FIG. 5 is a cross-sectional view taken along the line V-V of FIG. 4.
Figure 6:
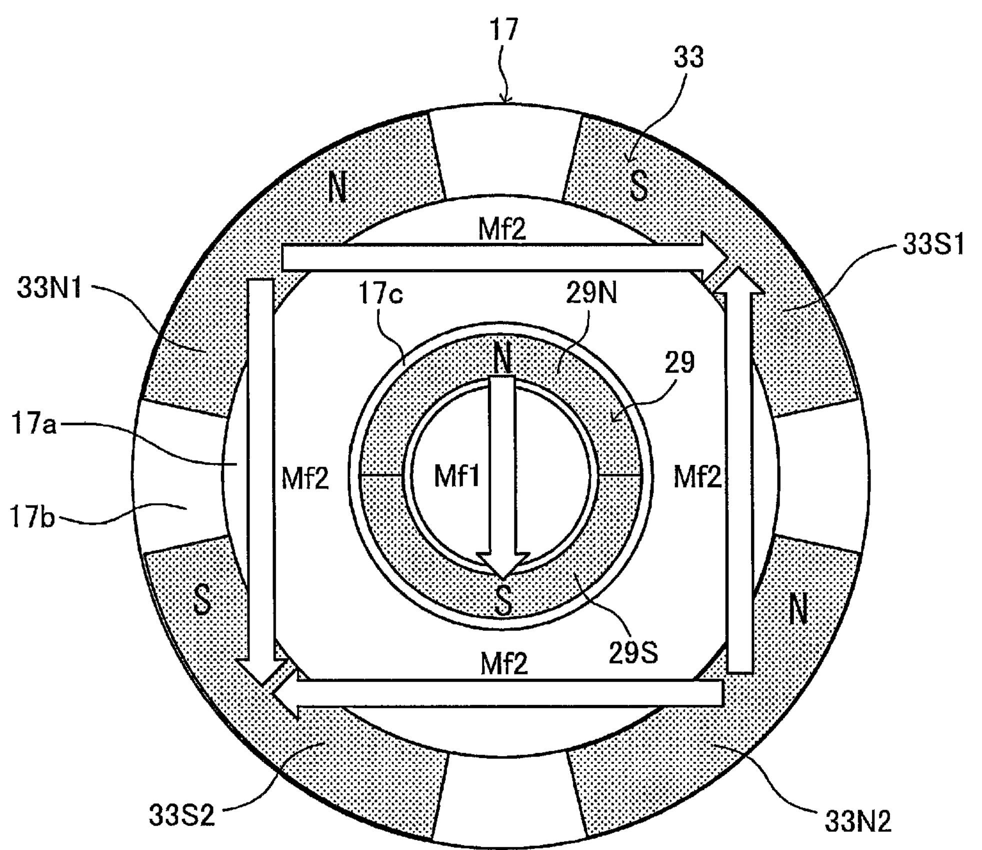
FIG. 6 is a plan view illustrating an example of a flow of magnetic flux caused by the magnets.
Figure 7:
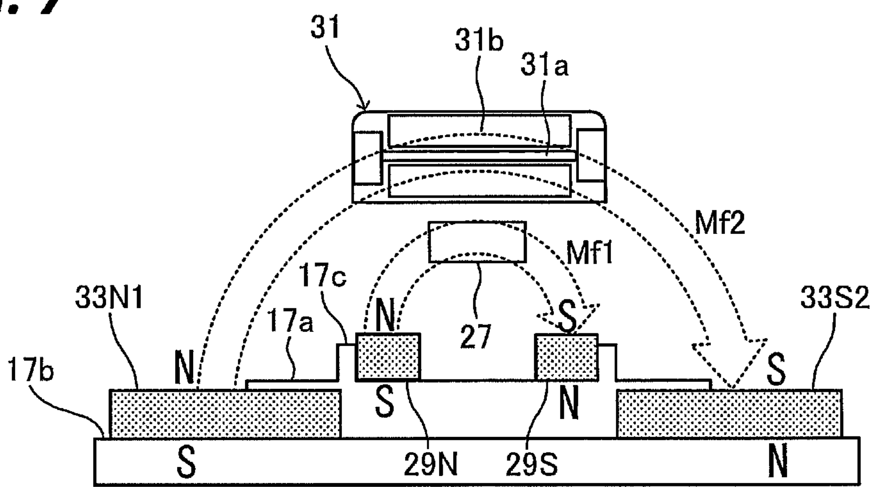
FIG. 7 is a side view illustrating an example of a flow of magnetic flux caused by the magnets.
Figure 8:
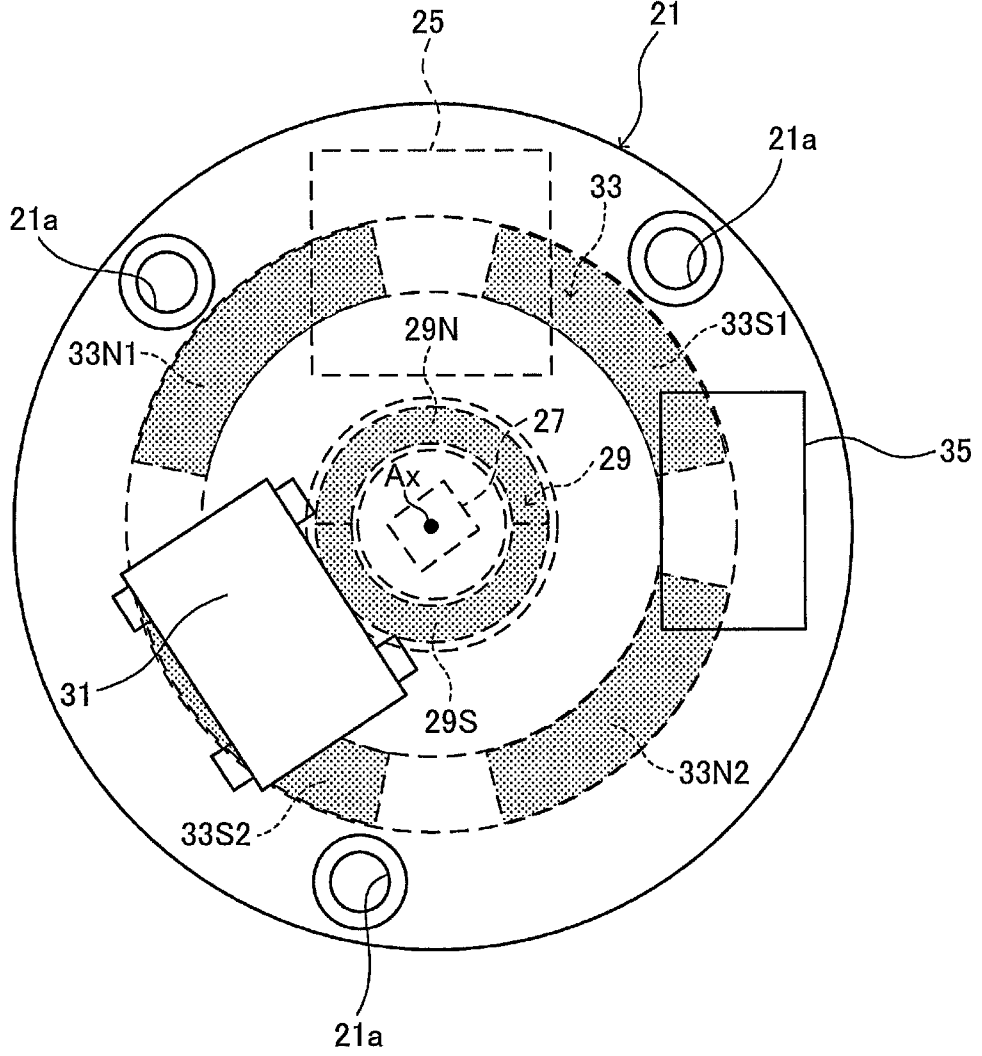
FIG. 8 is a plan view of a substrate illustrating an example of the positional relationship between a magnetic detection unit and a magnet, and between a trigger signal generator and a magnet.

An example of the configuration of the magnets 29 and 33 will be described with reference to FIGS. 4 to 8. FIG. 4 is a plan view of the hub 17 when viewed from the substrate 21, illustrating an example of the arrangement of the magnets 29 and 33. FIG. 5 is a cross-sectional view of the hub 17 taken along the line V-V of FIG. 4. FIG. 6 is a plan view illustrating an example of the flow of magnetic flux caused by the magnets 29 and 33. FIG. 7 is a side view illustrating an example of the flow of magnetic flux caused by the magnets 29 and 33. FIG. 8 is a plan view of the substrate 21, illustrating an example of the positional relationship between the magnetic detection unit 27 and the magnet 29, and between the trigger signal generator 31 and the magnet 33. The disk 19 is omitted in FIG. 4, and the connector 37 and the cable 45 are appropriately omitted in FIG. 8.

As illustrated in FIGS. 4 and 5, the hub 17 supports the magnets 33 and 29 such that the magnet 33 is disposed radially outward of the magnet 29. As an example, the hub 17 has an inner peripheral portion **17*a* located radially inward, and an outer peripheral portion 17*b* located radially outward of the inner peripheral portion 17*a* and having a thinner axial thickness than the inner peripheral portion 17*a*. The hub 17 is formed such that the load side surfaces of the inner peripheral portion 17*a* and the outer peripheral portion 17*b* are flush with each other, and a step is formed on the anti-load side surface between the inner peripheral portion 17*a* and the outer peripheral portion 17*b*. The disk 19 is disposed on the anti-load side of the inner peripheral portion 17*a*, and the magnet 33 is disposed on the anti-load side of the outer peripheral portion 17*b*. The disk 19 is fixed to the anti-load side surface of the inner peripheral portion 17*a*, for example, by adhesive, and the magnet 33 is fixed to the anti-load side surface of the outer peripheral portion 17*b*, for example, by adhesive. The inner peripheral side of the magnet 33 abuts against or comes close to the step of the hub 17. The anti-load side surface of the inner peripheral portion 17*a* of the hub 17 protrudes toward the anti-load side further than the anti-load side surface of the magnet 33, which is arranged on the outer peripheral portion 17*b*. The disk 19 protrudes toward the outer peripheral side further than the inner peripheral portion 17*a* in the radial direction. With the above configuration, as illustrated in FIG. 5, a gap G is formed between the disk 19 and the magnet 33 in the axial direction. Further, an outer diameter D1 of the inner peripheral portion 17*a* in the radial direction is smaller than an inner diameter D2 of the scale S of the disk 19** in the radial direction.

With the above configuration, the hub 17 covers the load side of the magnet 33 like a back yoke, and supports the disk 19 such that the disk 19 covers the anti-load side of the magnet 33. That is, the hub 17 does not cover the anti-load side of the magnet 33 like a back yoke, in other words, the hub 17 itself does not cover the load side of the outer periphery of the disk 19 (including the portion where the scale S is formed), and supports the disk 19 with the inner peripheral portion **17*a* such that the anti-load side surface of the magnet 33 faces the load side surface of the disk 19. Specifically, the hub 17 is formed such that the outer diameter of the inner peripheral portion 17*a* is smaller than the outer diameter of the outer peripheral portion 17***b*, the inner peripheral portion 17*a* is axially longer than the outer peripheral portion 17*b*, the magnet 33 is disposed to abut against the axial step between the outer peripheral portion 17*b* and the inner peripheral portion 17*a*, and the disk 19 is supported by the inner peripheral portion 17*a* to cover the magnet 33. A part made of a material that easily transmits magnetic flux (such as a non-magnetic material) may be sandwiched in the gap G between the anti-load side surface of the magnet 33 and the load side surface of the disk 19. Further, the anti-load side surface of the magnet 33 and the load side surface of the disk 19 may be abutted against each other.

The magnet 33 is configured such that the N poles and the S poles alternate every 90 degrees in the circumferential direction. As an example, as illustrated in FIG. 4, the magnet 33 has a plurality of magnets (e.g., four magnets) arranged with a gap between each other along the circumferential direction so that each magnet has a magnetic pole in the axial direction by being magnetized in the axial direction, and adjacent magnets have different magnetic poles. The plurality of magnets includes two magnets 33N1 and 33N2 magnetized with a N pole on the anti-load side and a S pole on the load side, and two magnets 33S1 and 33S2 magnetized with a S pole on the anti-load side and a N pole on the load side, for a total of four magnets. These magnets 33N1, 33S1, 33N2, and 33S2 are arranged such that the magnetic pole on the anti-load side alternates between N poles and S poles every 90 degrees in the circumferential direction. Each of the plurality of magnets 33N1, 33S1, 33N2, and 33S2 of the magnet 33 has an arc shape. The magnet 33 may be in a shape other than an arc shape, for example, a circle, an ellipse, a quadrangle such as a square or a rectangle, a polygon other than a quadrangle, etc. The magnets 33N1, 33S1, 33N2, 33S2 of the magnet 33 may be arranged without any gaps, or the magnet 33 may be a single ring-shaped magnet magnetized in the axial direction such that the magnetic pole on the anti-load side alternates between N poles and S poles every 90 degrees.

The magnet 29 is configured such that the N poles and the S poles alternate every 180 degrees in the circumferential direction. As an example, as illustrated in FIG. 4, the magnet 29 is a ring-shaped magnet, magnetized in the axial direction, and configured such that the magnetic poles on the anti-load side alternate between N poles and S poles every 180 degrees in the circumferential direction. The magnet 29 has a magnetic pole 29N in which the anti-load side is magnetized as an N pole and the load side is magnetized as an S pole, and a magnetic pole 29S in which the anti-load side is magnetized as an S pole and the load side is magnetized as an N pole. The magnet 29 may have a shape other than a ring shape, for example, a disc shape, a quadrangle such as a square or a rectangle, or a polygon other than a quadrangle. The magnet 29 may also have, for example, two magnets an N pole and an S pole. As illustrated in FIGS. 4 and 5, the hub 17 has a magnet accommodating portion 17*c* having a wall portion protruding toward the magnetic detection portion 27 side (anti-load side) along the outer peripheral shape of the magnet 29. The magnet 29 is accommodated in the magnet accommodating portion 17*c* so as to fit into the wall portion, and is fixed to the bottom and wall of the magnet accommodating portion 17*c* by, for example, an adhesive. The magnet accommodating portion 17*c* is provided further radially inward from the inner peripheral portion 17*a*. A circular through hole 19*a* corresponding to the magnet accommodating portion 17*c* is formed in the center of the disk 19, and the disk 19 is positioned by the through hole 19*a* abutting against the wall of the magnet accommodating portion 17*c*. The axial height of the wall of the magnet housing portion 17*c* is not particularly limited, but is lower than the magnet 29 in the example illustrated in FIG. 5. The height of the wall may be equal to or higher than the magnet 29.

As illustrated in FIG. 4, at least one of the magnets 33N1, 33S1, 33N2, and 33S2 constituting the magnet 33 and the magnet 29 is arranged with the circumferential angle adjusted such that the angular position Ap1 of the boundary between the magnetic poles 29N and 29S of the magnet 29 is shifted by approximately 45 degrees from the angular position Ap2 of the circumferential center of any one of the magnets 33N1, 33S1, 33N2, and 33S2 of the magnet 33. The angular difference between the angular positions Ap1 and Ap2 is not limited to 45 degrees, and may be any angle greater than 0 degrees (but, preferably closer to 45 degrees).

As illustrated in FIGS. 6 and 7, the magnetic flux Mf1 of the magnet 29 is an arc-shaped magnetic flux that exits the magnetic pole 29N, passes through the magnetic detection unit 27, and enters the magnetic pole 29S on the radially inner side of the anti-load side of the hub 17. The magnetic flux Mf1 has a predetermined width that flows from the vicinity of the center of the magnetic pole 29N to the vicinity of the center of the magnetic pole 29S. The magnetic flux may also be called a magnetism or a magnetic field. The magnet 29 is magnetized in the axial direction, and the hub 17 made of a magnetic material serves as a back yoke, which has a synergistic effect, thereby increasing the strength of the magnetic flux Mf1 and increasing the amount of magnetic flux that passes through the magnetic detection unit 27. In addition, the wall of the magnet accommodating unit 17*c* may suppress the radially outward diffusion of the magnetic flux Mf1 and concentrate the magnetic flux Mf1 on the magnetic detection unit 27 side, thereby reducing magnetic interference with the magnet 33 on the outer periphery.

The magnetic fluxes Mf2 of the magnet 33 are a total of four magnetic fluxes, two arc-shaped magnetic fluxes emerging from the magnet 33N1 and entering the magnet 33S1 or the magnet 33S2, and two arc-shaped magnetic fluxes emerging from the magnet 33N2 and entering the magnet 33S1 or the magnet 33S2, on the radially outer side of the anti-load side of the hub 17. Each of the magnetic fluxes Mf2 has a predetermined width that flows from the vicinity of the center of the magnet 33N1 toward the vicinity of the center of the magnet 33S1 or the magnet 33S2, and from the vicinity of the center of the magnet 33N2 toward the vicinity of the center of the magnet 33S1 or the magnet 33S2. Rotation of the hub 17 causes any one of the magnetic fluxes Mf2 to pass through the trigger signal generator 31 and generate a Large Barkhausen effect that reverses the magnetization direction of the magnetic element 31*a*. The synergistic effect of the magnets 33N1, 33S1, 33N2, and 33S2 being magnetized in the axial direction and the outer peripheral portion 17*b* of the hub 17 made of a magnetic material serving as a back yoke increases the strength of the magnetic fluxes Mf2, thereby increasing the amount of magnetic flux passing through the trigger signal generator 31. In addition, the magnets 33N1, 33S1, 33N2, and 33S2 are arranged with a gap between each other, thereby increasing the arch shape of the magnetic flux Mf2 formed between each magnet and making it easier to reach the trigger signal generator 31.

The arrangement of the magnetic detection unit 27 and the trigger signal generator 31 is optimized in response to the magnetic flux Mf1 of the magnet 29 and the magnetic fluxes Mf2 of the magnet 33. As an example, as illustrated in FIG.

8, the magnetic detection unit 27 is arranged on the rotation axis Ax on the load side surface of the substrate 21 to face the magnet 29 and to be located at the approximate center of the magnetic flux Mf1. The trigger signal generator 31 is arranged on the anti-load side surface of the substrate 21 so as to be located at the approximate center of the magnetic fluxes Mf2 in the radial direction. Specifically, the center of the trigger signal generator 31 is arranged to be located slightly radially inward from the rotation trajectory of the magnets 33N1, 33S1, 33N2, and 33S2. The circumferential mounting angles of the magnetic detection unit 27 and the magnet 29 are set based on the phase angle of the trigger signal generated by the trigger signal generator 31 and the phase angles of the A-phase multi-rotation signal Ma and the B-phase multi-rotation signal Mb generated by the processing module 43, taking into consideration the hysteresis of the phase angle of the trigger signal. This will be described later.

4. Functional Configuration of Processing Module

An example of the functional configuration of the processing module 43 will be described with reference to FIG. 9. FIG. 9 is a block diagram illustrating an example of the functional configuration of the processing module 43.

The processing module 43 generates position data of the disk 19 based on both the angle position information and the multiple rotation information when external power is supplied to the encoder 7, and generates the amount of multiple rotations of the disk 19 based on the multiple rotation information detected by the magnetic detection unit 27 using power supplied from the battery 35 when external power is not supplied to the encoder 7. Descriptions will be made on an example of a functional configuration for implementing such functions of the processing module 43.

As illustrated in FIG. 9, the processing module 43 has an angular position signal generating unit 47, an A-phase multi-rotation signal generating unit 49, a B-phase multi-rotation signal generating unit 51, a counter 53, a position data generating unit 55, and a recording unit 57.

The angular position signal generating unit 47 identifies the absolute position within one rotation of the disk 19 based on the output of the light receiving array PA. The method of identifying the absolute position is not particularly limited. For example, a plurality of light receiving elements of the light receiving array PA may treat each light reception or non-reception as a bit based on the presence or absence of detection of the scale SA having an absolute pattern, and output a multi-bit absolute signal. In this case, the angular position signal generating unit 47 decodes the absolute position that has been encrypted (encoded) into a serial bit pattern based on the absolute signal, and identifies the absolute position.

The angular position signal generating unit 47 identifies a relative position within one rotation of the disk 19 based on the output of the light receiving array PI. For example, a plurality of light receiving elements of the light receiving array PI may output an incremental signal based on the detection result of a scale SI having an incremental pattern. In this case, the angular position signal generating unit 47 identifies a position within one pitch of the incremental pattern based on the incremental signal.

The angular position signal generating unit 47 generates an angular position signal As representing a highly accurate angular position within one rotation of the disk 19 by superimposing a position within one pitch determined based on the incremental signal, on the absolute position determined based on the absolute signal.

The A-phase multi-rotation signal generating unit 49 converts the A-phase signal from the magnetic detection unit 27 into a rectangular wave signal to generate an A-phase multi-rotation signal Ma (an example of a second electric signal; see FIGS. 12 and 13 described later). As described above, since the direction of the magnetic flux of the magnet 29 reverses every rotation angle range of approximately 180 degrees, the A-phase multi-rotation signal Ma has a duty ratio of 50% and is a signal of one pulse per rotation of the disk 19. The A-phase multi-rotation signal generating unit 49 is, for example, a comparator. The "second electric signal generated by the second magnetic detection unit" includes the A-phase multi-rotation signal Ma, which is a pulse signal generated by binarizing the A-phase signal, which is an analog signal output from the magnetic detection unit 27, by the A-phase multi-rotation signal generating unit 49.

The B-phase multi-rotation signal generating unit 51 converts the B-phase signal from the magnetic detection unit 27 into a rectangular wave signal to generate a B-phase multi-rotation signal Mb (an example of a second electrical signal; see FIGS. 12 and 13 described later). Like the A-phase multi-rotation signal Ma, the B-phase multi-rotation signal Mb has a duty ratio of 50% and is a signal of one pulse per rotation of the disk 19. The B-phase multi-rotation signal Mb has a phase difference of 90 degrees from the A-phase multi-rotation signal Ma. The B-phase multi-rotation signal generating unit 51 is, for example, a comparator. The "second electric signal generated by the second magnetic detection unit" includes the B-phase multi-rotation signal Mb, which is a pulse signal generated by binarizing the B-phase signal, which is an analog signal output from the magnetic detection unit 27, by the B-phase multi-rotation signal generating unit 51.

The counter 53 executes a count calculation process to count the number of rotations of the disk 19 based on the A-phase multi-rotation signal Ma and the B-phase multi-rotation signal Mb, and generates a multi-rotation signal Rn. The counter 53 outputs the multi-rotation signal Rn, which is the result of the count calculation process, to the position data generating unit 55.

The processing module 43 is in an active mode when external power is supplied to the encoder 7. In the active mode with external power, the processing module 43 supplies power to the magnetic detection unit 27. The position data generation unit 55 generates position data by synthesizing the angular position signal As and the multi-rotation signal Rn, and outputs the position data to the control device 5. The processing module 43 switches to a sleep mode when external power is not supplied to the encoder 7. In the sleep mode, the processing module 43 stops supplying power to the magnetic detection unit 27. In the sleep mode, the processing module 43 stops various arithmetic processes including the generation of position data, but does not enter a completely stopped state, and the activated state is maintained by the power supplied from the battery 35.

As described above, the trigger signal generator 31 generates a trigger signal by the rotation of the disk 19. When a trigger signal is received from the trigger signal generator 31 in the sleep mode, the processing module 43 returns from the sleep mode to the active mode by the power supplied from the battery 35. In the active mode by the battery 35, the processing module 43 supplies power to the magnetic detection unit 27 and acquires the A-phase signal and the B-phase signal from the magnetic detection unit 27. The counter 53 receives the A-phase multi-rotation signal Ma from the A-phase multi-rotation signal generating unit 49 and the B-phase multi-rotation signal Mb from the B-phase multi-rotation signal generating unit 51, and executes a count calculation process. The counter 53 records the multi-rotation signal Rn, which is the result of the count calculation process, in the recording unit 57. After acquiring the A-phase signal and the B-phase signal from the magnetic detection unit 27, the processing module 43 stops the supply of power from the battery 35 to the magnetic detection unit 27. For example, the supply of power to the magnetic detection unit 27 may be stopped before the start of the count calculation process.

The recording unit 57 records the multiple rotation signal Rn from the counter 53. The recording unit 57 is not particularly limited and may be any non-volatile memory that can read and write data and can retain the recorded contents even when power is not applied. For example, a ferroelectric memory may be used as the recording unit 57. The recording unit 57 is built into the processing module 43. The recording unit 57 may be installed outside the processing module 43.

When the encoder 7 is restored from the state where no external power is supplied to the state where external power is supplied, the position data generating unit 55 reads out the multiple rotation signal Rn recorded in the recording unit 57, and generates an initial value of the position data by combining the multiple rotation signal Rn with the angular position signal As output from the angular position signal generating unit 47. Thereafter, the processing module 43 executes a normal position data generating process when the encoder 7 is supplied with external power.

The processes in the angular position signal generating unit 47, the A-phase multi-rotation signal generating unit 49, the B-phase multi-rotation signal generating unit 51, the counter 53, the position data generating unit 55, and the recording unit 57 as described above are not limited to the examples of the division of the processes. For example, the processes may be performed by a smaller number of processing units (e.g., one processing unit), or by a processing unit that is further divided. In the processing module 43, only the portion that supplies power to the magnetic detection unit 27 may be implemented by an actual device, and the other functions of each of the above-mentioned processing units may be implemented by a program executed by a CPU (not illustrated). Some or all of the functions of each processing unit may be implemented by an actual device such as an ASIC, an FPGA, or other electric circuit.

Figure 10:
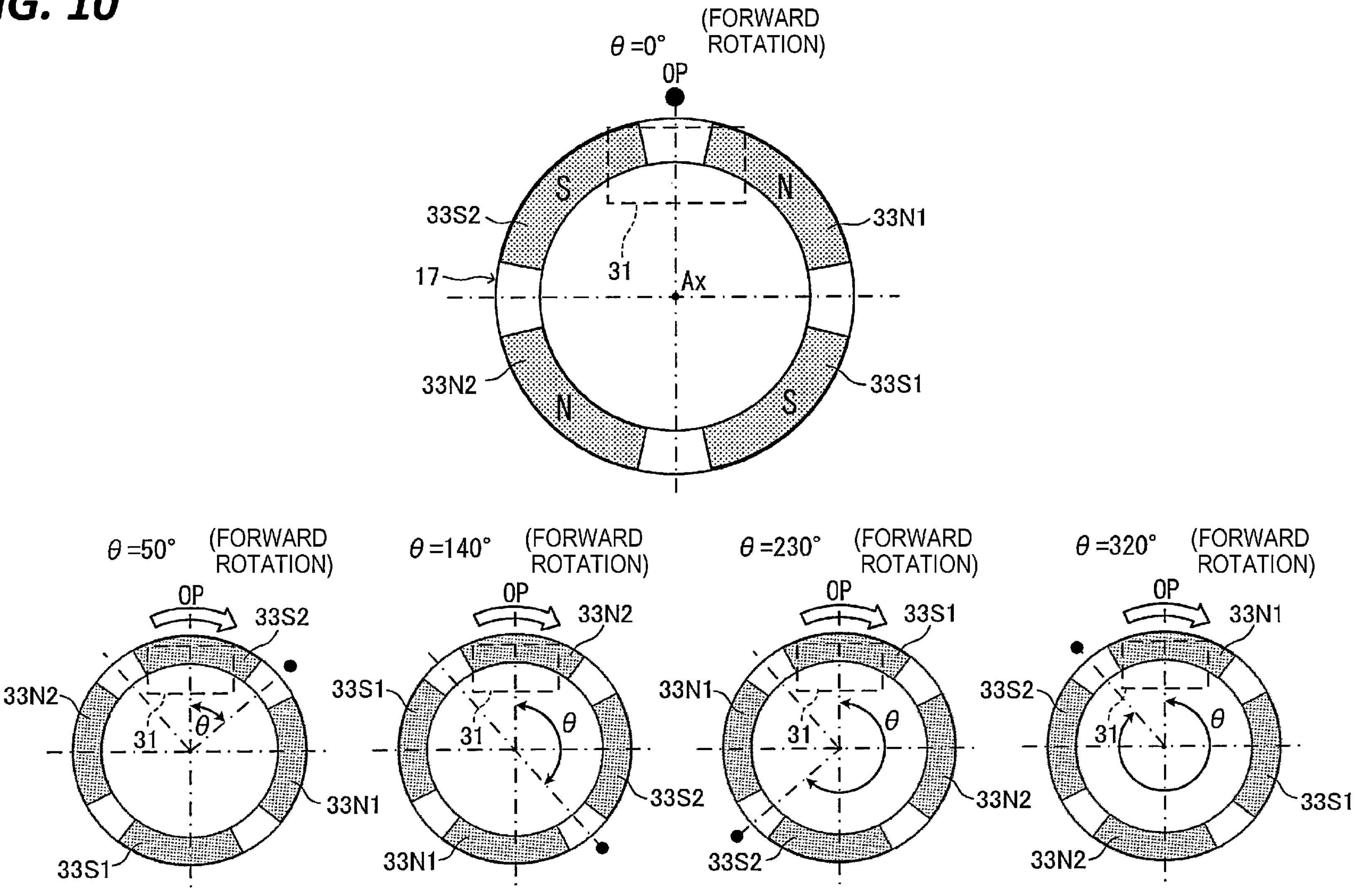
FIG. 10 is an explanatory diagram illustrating an example of an angular position of the magnets when a trigger signal is generated in the case where the disk rotates in the forward direction.
Figure 11:
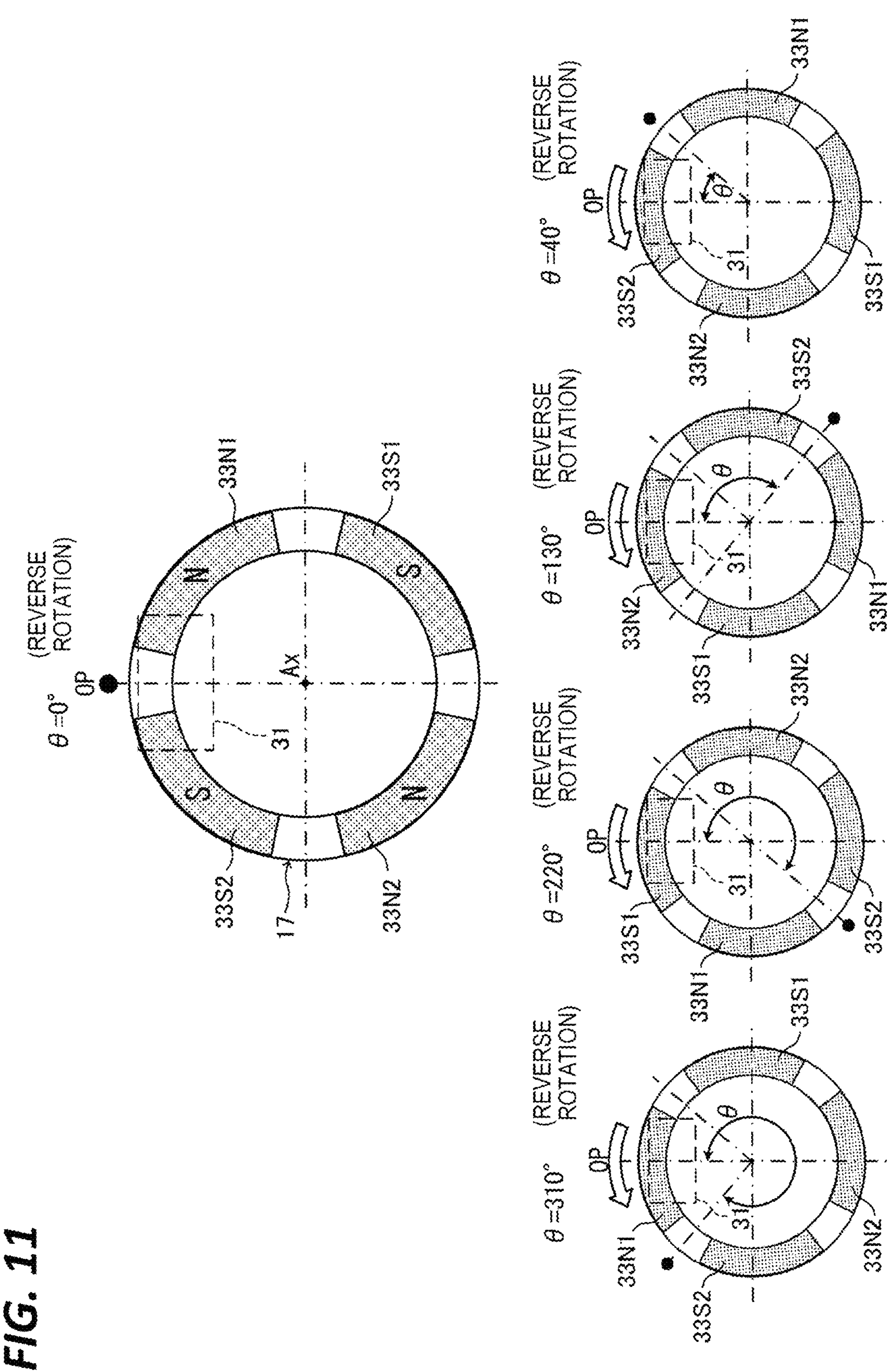
FIG. 11 is an explanatory diagram illustrating an example of the angular position of the magnets when a trigger signal is generated in the case where the disk rotates in the reverse direction.

5. Magnetic Detection Unit and Magnet Mounting Angle Based on Phase Angle Between Trigger Signal and Multi-Rotation Signal In the encoder 7 of the embodiment, the circumferential mounting angles of the magnetic detection unit 27 and the magnet 29 are set based on the phase angle of the trigger signal generated by the trigger signal generator 31 and the phase angles of the A-phase multi-rotation signal Ma and the B-phase multi-rotation signal Mb generated by the processing module 43, taking into consideration the hysteresis of the phase angle of the trigger signal. The details will be described with reference to FIGS. 10 to 13. FIG. 10 is an explanatory diagram illustrating an example of an angular position of the magnet 33 when a trigger signal is generated in the case where the disk 19 rotates in the forward direction. FIG. 11 is an explanatory diagram illustrating an example of the angular position of the magnet 33 when a trigger signal is generated in the case where the disk 19 rotates in the reverse direction. FIG. 12 is an explanatory diagram illustrating an example of the waveforms of the trigger signal, A-phase multi-rotation signal Ma, and B-phase multi-rotation signal Mb when the phase angle hysteresis of the trigger signal is large. FIG. 13 is an explanatory diagram illustrating an example of the waveforms of the trigger signal, A-phase multi-rotation signal Ma, and B-phase multi-rotation signal Mb when the phase angle hysteresis of the trigger signal is small. For convenience of descriptions, FIGS. 10 and 11 omit the illustration of the magnet 29. Further, when viewed from the anti-load side in the axial direction, for example, rotation of the magnet 33 (hub 17, disk 19) in a clockwise direction (an example of a first direction) is regarded as forward rotation, and rotation of the magnet 33 in a counterclockwise direction (an example of a second direction) is regarded as reverse rotation. Further, for example, the case where the circumferential center position of the gap between magnets 33N1 and 33S2 (illustrated by a black circle in FIGS. 10 and 11) is located at an origin OP, which is a predetermined reference angle, is taken as a reference, and the rotation angle (phase angle) in the forward direction of the circumferential center position of the gap between magnets 33N1 and 33S2 relative to the origin OP is taken as θ.

The magnetic field of the trigger signal generator 31 reaches its maximum value when the central position between the N pole and the S pole comes directly beneath the trigger signal generator 31, the magnetic field reaches zero when the hub 17 rotates 45 degrees and the central position of the N pole or the S pole comes directly beneath the trigger signal generator 31, and then the angle advances slightly from there, and a trigger signal is generated when the magnetic field in the opposite direction applied to the trigger signal generator 31 exceeds a certain strength. In the embodiment, when the hub 17 rotates forward, the trigger signal generator 31 generates a trigger signal at a predetermined first phase angle based on detection of the magnetism of the magnet 33. For example, in the examples illustrated in FIGS. 10 to 12, when the magnet 33 rotates forward, the trigger signal generator 31 generates a trigger signal at each timing where θ is 50 degrees, 140 degrees, 230 degrees, and 320 degrees (an example of a first phase angle). Further, when the magnet 33 rotates reverse, the trigger signal generator 31 generates a trigger signal at a second phase angle based on detection of the magnetism of the magnet 33. For example, in the examples illustrated in FIGS. 11 and 12, when the magnet 33 rotates reverse, the trigger signal generator 31 generates a trigger signal at each timing where θ is 310 degrees, 220 degrees, 130 degrees, and 40 degrees (an example of a second phase angle). In the examples illustrated in FIGS. 10 to 12, in the forward rotation, a trigger signal is generated when the center position between the N pole and the S pole has a phase angle of −40 degrees with respect to the origin OP, and in the reverse rotation, a trigger signal is generated when the center position between the N pole and the S pole has a phase angle of +40 degrees with respect to the origin OP. In other words, FIGS. 10 to 12 correspond to the case where the hysteresis of the phase angle of the trigger signal is ±40 degrees.

The A-phase multi-rotation signal Ma and the B-phase multi-rotation signal Mb are different from each other by 90 degrees in phase, and are pulse-shaped signals that switch between high and low at the third phase angle. For example, in the example illustrated in FIG. 12, the A-phase multi-rotation signal Ma switches between high and low at phase angles of 0 degrees and 180 degrees (an example of the third phase angle), and the B-phase multi-rotation signal Mb switches between high and low at phase angles of 90 degrees and 270 degrees (an example of the third phase angle). At least one of the magnet 29 and the magnetic detection unit 27 is arranged with its circumferential mounting angle adjusted such that the third phase angle has a phase difference of a predetermined angle or more with respect to each of the first phase angle and the second phase angle. The reason for providing a phase difference of a predetermined angle or more is as follows.

After the processing module 43 receives a trigger signal and transitions from the sleep mode to the active mode, a slight time delay occurs before the counter 53 actually reads the A-phase multi-rotation signal Ma from the A-phase multi-rotation signal generating unit 49 and the B-phase multi-rotation signal Mb from the B-phase multi-rotation signal generating unit 51. The rotation angle advances during this time delay, and the values of the A-phase multi-rotation signal Ma and the B-phase multi-rotation signal Mb at the time the trigger signal is generated and the values of the A-phase multi-rotation signal Ma and the B-phase multi-rotation signal Mb may change at the time the counter 53 reads the signals. The fluctuation in the values is more likely to occur when the rotation speed is high. Therefore, it is desirable to provide a phase difference of a predetermined angle or more between the timing of the generation of the trigger signal (first and second phase angles) and the timing at which the A-phase multi-rotation signal Ma and the B-phase multi-rotation signal Mb switch between high and low (third phase angle), thereby avoiding unstable detection caused by reading near the timing at which the signals switch between high and low. For example, a phase difference of a predetermined angle or more may be determined in consideration of the time delay at the maximum rotation speed of the motor, which is the most severe condition. Specifically, at the maximum rotation speed (e.g., 6,000 rotations per minute), it takes about 0.5 milliseconds from the generation of a trigger until the counter 53 completes reading the values of the A-phase multi-rotation signal Ma and the B-phase multi-rotation signal Mb, which is converted into an angle of about 20 degrees, so it is preferable that the "predetermined angle or more" is 20 degrees or more. It is more preferable when it is 30 degrees or more.

Figure 12:
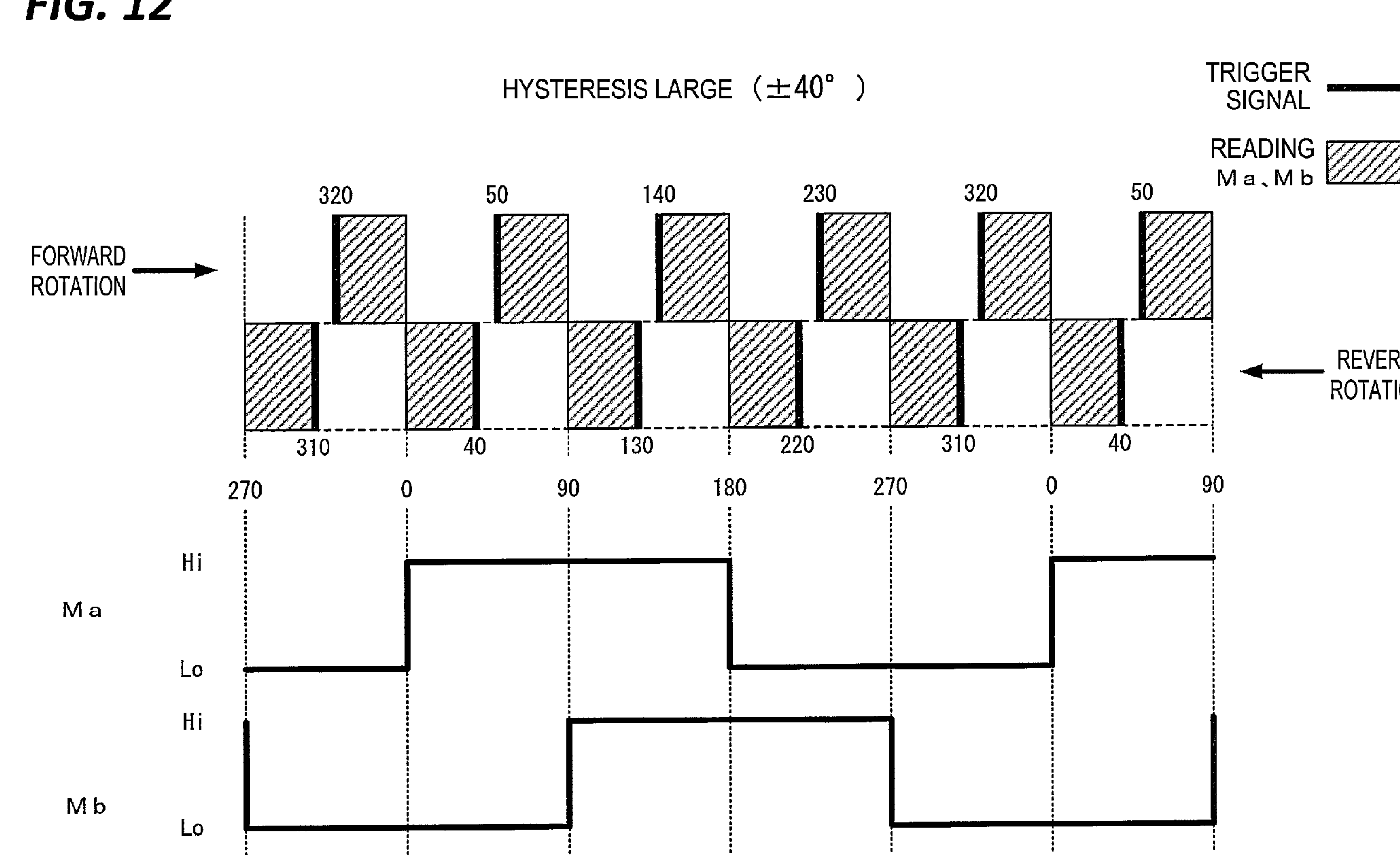
FIG. 12 is an explanatory diagram illustrating an example of the waveforms of the trigger signal, A-phase multi-rotation signal, and B-phase multi-rotation signal when the phase angle hysteresis of the trigger signal is large.

In the example illustrated in FIG. 12, the mounting angle of at least one of the magnet 29 and the magnetic detection unit 27 is adjusted and arranged such that the third phase angle (0 degrees, 90 degrees, 180 degrees, 270 degrees) has a phase difference of a predetermined angle or more (40 degrees in this example) with respect to each of the first phase angle (50 degrees, 140 degrees, 230 degrees, 320 degrees) and the second phase angle (40 degrees, 130 degrees, 220 degrees, 310 degrees). Ideally, it is desirable to adjust the mounting angle of at least one of the magnet 29 and the magnetic detection unit 27 such that the third phase angle (0 degrees, 90 degrees, 180 degrees, 270 degrees) is located in the middle of the corresponding first and second phase angles (320 degrees and 40 degrees, 50 degrees and 130 degrees, 140 degrees and 220 degrees, 230 degrees and 310 degrees).

The hatched portion in FIG. 12 is an example of the timing at which the counter 53 of the processing module 43 reads the A-phase multi-rotation signal Ma and the B-phase multi-rotation signal Mb. In the example illustrated in FIG. 12, during forward rotation, after a trigger signal is generated when θ is 50 degrees, the A-phase multi-rotation signal Ma (high) and the B-phase multi-rotation signal Mb (low) are read when θ is in the range of, for example, 50 degrees to 90 degrees. Similarly, after a trigger signal is generated when θ is 50 degrees, the A-phase multi-rotation signal Ma (high) and the B-phase multi-rotation signal Mb (high) are read when θ is in the range of, for example, 140 degrees to 180 degrees. After a trigger signal is generated when θ is 230 degrees, the A-phase multi-rotation signal Ma (low) and the B-phase multi-rotation signal Mb (high) are read when θ is in the range of, for example, 230 degrees to 270 degrees. After a trigger signal is generated when θ is 320 degrees, the A-phase multi-rotation signal Ma (low) and the B-phase multi-rotation signal Mb (low) are read when θ is in the range of, for example, 320 degrees to 0 degrees (360 degrees). Meanwhile, during reverse rotation, after a trigger signal is generated when θ is 310 degrees, the A-phase multi-rotation signal Ma (low) and the B-phase multi-rotation signal Mb (low) are read when θ is in the range of, for example, 310 degrees to 270 degrees. Similarly, after a trigger signal is generated when θ is 220 degrees, the A-phase multi-rotation signal Ma (low) and the B-phase multi-rotation signal Mb (high) are read when θ is in the range of, for example, 220 degrees to 180 degrees. After a trigger signal is generated when θ is 130 degrees, the A-phase multi-rotation signal Ma (high) and the B-phase multi-rotation signal Mb (high) are read when θ is in the range of, for example, 130 degrees to 90 degrees. After a trigger signal is generated when θ is 40 degrees, the A-phase multi-rotation signal Ma (high) and the B-phase multi-rotation signal Mb (low) are read when θ is in the range of, for example, 40 degrees to 0 degrees. By having the counter 53 read the A-phase multi-rotation signal Ma and the B-phase multi-rotation signal Mb within the above-mentioned phase angle range, it is possible to avoid unstable detection caused by reading near the timing when the high and low signals switch, and it is possible to stably count the number of rotations of the disk 19.

In the above, descriptions have been made on the case where the hysteresis of the phase angle of the trigger signal is relatively large (±40 degrees), but the hysteresis may be small depending on the device configuration. For example, in the examples illustrated in FIG. 13, when the magnet 33 rotates forward, the trigger signal generator 31 generates a trigger signal at each timing where θ is 80 degrees, 170 degrees, 260 degrees, and 350 degrees (an example of a first phase angle). Further, when the magnet 33 rotates reverse, the trigger signal generator 31 generates a trigger signal at each timing where θ is 280 degrees, 190 degrees, 100 degrees, and 10 degrees (an example of the second phase angle). In the examples illustrated in FIG. 13, in the forward rotation, a trigger signal is generated when the center position between the N pole and the S pole has a phase angle of −10 degrees with respect to the origin OP, and in the reverse rotation, a trigger signal is generated when the center position between the N pole and the S pole has a phase angle of +10 degrees with respect to the origin OP. In other words, FIG. 13 correspond to the case where the hysteresis of the phase angle of the trigger signal is ±10 degrees.

Figure 13:
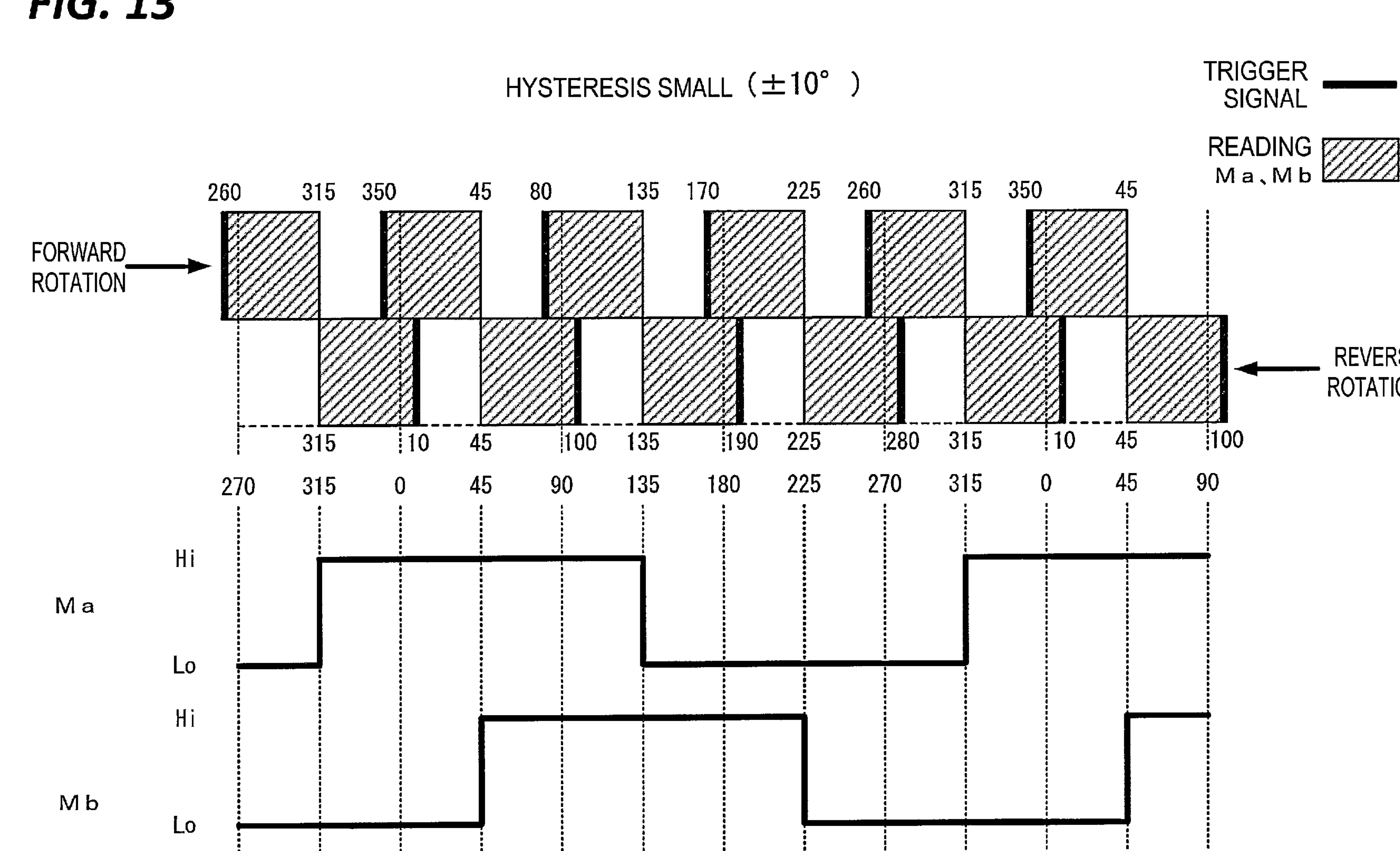
FIG. 13 is an explanatory diagram illustrating an example of the waveforms of the trigger signal, A-phase multi-rotation signal, and B-phase multi-rotation signal when the phase angle hysteresis of the trigger signal is small.

In the example illustrated in FIG. 13, the A-phase multi-rotation signal Ma switches between high and low at phase angles of 135 degrees and 315 degrees (an example of the third phase angle), and the B-phase multi-rotation signal Mb switches between high and low at phase angles of 45 degrees and 225 degrees (an example of the third phase angle). For the reason described above, at least one of the magnet 29 and the magnetic detection unit 27 is arranged with its circumferential mounting angle adjusted such that the third phase angle has a phase difference of a predetermined angle or more with respect to each of the first phase angle and the second phase angle. In the example illustrated in FIG. 13, the mounting angle of at least one of the magnet 29 and the magnetic detection unit 27 is adjusted and arranged such that the third phase angle (45 degrees, 135 degrees, 225 degrees, 315 degrees) has a phase difference of a predetermined angle or more (35 degrees in this example) with respect to each of the first phase angle (80 degrees, 170 degrees, 260 degrees, 350 degrees) and the second phase angle (10 degrees, 100 degrees, 190 degrees, 280 degrees). Ideally, it is desirable to adjust the mounting angle of at least one of the magnet 29 and the magnetic detection unit 27 such that the third phase angle (45 degrees, 135 degrees, 225 degrees, 315 degrees) is located in the middle of the corresponding first and second phase angles (350 degrees and 100 degrees, 80 degrees and 190 degrees, 170 degrees and 280 degrees, 260 degrees and 10 degrees).

The hatched portion in FIG. 13 is an example of the timing at which the counter 53 of the processing module 43 reads the A-phase multi-rotation signal Ma and the B-phase multi-rotation signal Mb. In the example illustrated in FIG. 13, during forward rotation, after a trigger signal is generated when θ is 80 degrees, the A-phase multi-rotation signal Ma (high) and the B-phase multi-rotation signal Mb (high) are read when θ is in the range of, for example, 80 degrees to 135 degrees. Similarly, after a trigger signal is generated when θ is 170 degrees, the A-phase multi-rotation signal Ma (low) and the B-phase multi-rotation signal Mb (high) are read when θ is in the range of, for example, 170 degrees to 225 degrees. After a trigger signal is generated when θ is 260 degrees, the A-phase multi-rotation signal Ma (low) and the B-phase multi-rotation signal Mb (low) are read when θ is in the range of, for example, 260 degrees to 315 degrees. After a trigger signal is generated when θ is 350 degrees, the A-phase multi-rotation signal Ma (high) and the B-phase multi-rotation signal Mb (low) are read when θ is in the range of, for example, 350 degrees to 45 degrees. Meanwhile, during reverse rotation, after a trigger signal is generated when θ is 280 degrees, the A-phase multi-rotation signal Ma (low) and the B-phase multi-rotation signal Mb (low) are read when θ is in the range of, for example, 280 degrees to 225 degrees. Similarly, after a trigger signal is generated when θ is 190 degrees, the A-phase multi-rotation signal Ma (low) and the B-phase multi-rotation signal Mb (high) are read when θ is in the range of, for example, 190 degrees to 135 degrees. After a trigger signal is generated when θ is 100 degrees, the A-phase multi-rotation signal Ma (high) and the B-phase multi-rotation signal Mb (high) are read when θ is in the range of, for example, 100 degrees to 45 degrees. After a trigger signal is generated when θ is 10 degrees, the A-phase multi-rotation signal Ma (high) and the B-phase multi-rotation signal Mb (low) are read when θ is in the range of, for example, 10 degrees to 315 degrees. By having the counter 53 read the A-phase multi-rotation signal Ma and the B-phase multi-rotation signal Mb within the above-mentioned phase angle range, it is possible to avoid unstable detection caused by reading near the timing when the high and low signals switch, and it is possible to stably count the number of rotations of the disk 19.

The above waveforms are examples, and the hysteresis of the phase angle of the trigger signal may be any angle other than the above, and the timing for reading the A-phase multi-rotation signal Ma and the B-phase multi-rotation signal Mb may also be other than the above range.

6. Effect of Embodiment

As described above, in the encoder 7 of the embodiment, the disk 19 and the magnet 33 are fixed to the rotatable hub 17 and rotate together with the hub 17 around the rotation axis Ax. The magnet 33 is disposed on the load side of the disk 19 in the axial direction. The trigger signal generator 31 that detects the magnetism of the magnet 33 is disposed on the anti-load side of the disk 19 in the axial direction. According to the encoder 7 of the embodiment, the axial dimension of the encoder 7 may be made smaller than the case where both the magnet 33 and the trigger signal generator 31 are disposed on either the load side or anti-load side of the disk 19 in the axial direction.

In the embodiment, the hub 17 may be made of a magnetic material, and may be formed to cover the load side of the magnet 33. In this case, the hub 17 may function as a back yoke, and the strength of the magnetic field generated from the magnet 33 toward the trigger signal generator 31 may be increased. Further, the hub 17 may function as a magnetic shield, and may block leakage magnetic flux from a motor or a brake device disposed on the load side of the encoder 7, thereby preventing a decrease in the detection accuracy of magnetism by the trigger signal generator 31 and the magnetic detection unit 27. In addition, it is possible to prevent the leakage magnetic flux from affecting electronic components mounted on the substrate 21, such as the optical module 25.

In the embodiment, the disk 19 may be made of a non-magnetic material, the hub 17 may support the disk 19 such that the disk 19 covers the anti-load side of the magnet 33, and the trigger signal generator 31 may detect the magnetism of the magnet 33 that has passed through the disk 19. In this case, since the disk 19 is made of a non-magnetic material, the magnetism of the magnet 33 may be transmitted through the disk 19 and detected by the trigger signal generator 31. This allows the radial dimension of the encoder 7 to be made smaller than the case where the magnet 33 and the trigger signal generator 31 are disposed radially outside the disk 19.

In the embodiment, the encoder 7 may have a gap G formed between the disk 19 and the magnet 33 in the axial direction. If the disk 19 and the magnet 33 come into contact with each other, the distance between the scale S of the disk 19 and the optical module 25 may vary as the disk 19 rotates due to the influence of unevenness on the surface of the magnet 33 and adhesive present between the disk 19 and the magnet 33. According to the encoder 7 of the embodiment, when the gap G is provided between the disk 19 and the magnet 33, the distance between the scale S of the disk 19 and the optical module 25 may be suppressed from varying due to the above, and the detection accuracy of the scale S by the optical module 25 may be ensured.

In the embodiment, the hub 17 may have an inner peripheral portion 17*a* located on the radially inner periphery side, and an outer peripheral portion 17*b* located on the radially outer periphery side of the inner peripheral portion 17*a* and having an axial thickness thinner than that of the inner peripheral portion 17*a*, and the disk 19 may be disposed on the anti-load side of the inner peripheral portion 17*a*, and the magnet 33 may be disposed on the anti-load side of the outer peripheral portion 17*b*. In this case, a configuration in which the disk 19 is disposed on the anti-load side of the magnet 33 may be implemented with a simple structure. Further, the magnet 33 may be positioned by utilizing the step between the inner peripheral portion 17*a* and the outer peripheral portion 17*b*.

In the embodiment, the anti-load side surface of the inner peripheral portion 17*a* of the hub 17 may protrude toward the anti-load side beyond the anti-load side surface of the magnet 33 disposed on the outer peripheral portion 17*b*, and the disk 19 may protrude toward the outer peripheral side more than the inner peripheral portion 17*a* in the radial direction. In this case, a configuration having a gap between the disk 19 and the magnet 33 may be implemented with a simple structure.

In the embodiment, the outer diameter D1 of the inner peripheral portion 17*a* in the radial direction may be smaller than the inner diameter D2 of the scale S in the radial direction. According to the encoder 7 of the embodiment, the fixing region of the disk 19 fixed to the inner peripheral portion 17*a* of the hub 17 may be a region on the inner peripheral side of the scale S. Therefore, the influence of the adhesive that bonds the disk 19 and the inner peripheral portion 17*a* may be eliminated, and the detection accuracy of the scale S by the optical module 25 may be ensured. In particular, when a gap G is formed between the disk 19 and the magnet 33, the gap G may be used to prevent fluctuations in the distance between the scale S and the optical module 25 due to unevenness on the surface of the magnet 33, while eliminating the influence of the adhesive, thereby significantly improving the detection accuracy.

In the embodiment, the magnet 33 may include a plurality of magnets 33N1, 33S1, 33N2, and 33S2 that have magnetic poles in the axial direction and are arranged with a gap between each other along the circumferential direction such that adjacent magnets have different magnetic poles. In this case, the arch shape of the magnetic flux Mf2 formed between the magnets may be made larger, making it easier to reach the trigger signal generator 31, compared to a case where no gap is formed between the magnets. Therefore, the degree of freedom in the arrangement of the trigger signal generator 31 is increased and the design becomes easier.

In the embodiment, each of the magnets 33N1, 33S1, 33N2, and 33S2 of the magnet 33 may have an arc shape. In this case, by making the magnet 33 in an arc shape and arranging the magnets with a gap between each other, a synergistic effect of both magnets may be achieved, allowing more magnetic flux to reach the trigger signal generator 31.

In the embodiment, the encoder 7 may have the magnet 29 that is fixed to the hub 17 at a position on the rotation axis Ax, and the magnetic detection unit 27 that is disposed to face the magnet 29 and detects the magnetism of the magnet 29, and the hub 17 may support the magnet 33 such that the magnet 33 is disposed on an outer peripheral side from the magnet 29 in a radial direction. In this case, the magnetic path of the magnet 33 and the magnetic path of the magnet 29 may be separated in the radial direction, thereby suppressing magnetic interference.

In the embodiment, the hub 17 may be made of a magnetic material, and may have a magnet accommodating portion 17*c* that includes a wall that protrudes toward the magnetic detection portion 27 along the outer peripheral shape of the magnet 29 and accommodates the magnet 29. In this case, the magnet 29 may be easily positioned and firmly fixed by fitting the magnet 29 into the wall of the magnet accommodating portion 17*c*. Further, the wall makes it easier for the magnetic flux of the magnet 29 to reach the magnetic detection portion 27, which improves the degree of freedom in the arrangement of the magnetic detection portion 27 and facilitates design. Furthermore, the wall may suppress the magnetic field of the magnet 29 from spreading to the outer peripheral side, thereby further reducing magnetic interference with the magnet 33 on the outer peripheral side.

In an embodiment, the magnet 33 may be configured such that N poles and S poles alternate every 90 degrees in the circumferential direction around rotation axis Ax, and the magnet 29 may be configured such that N poles and S poles alternate every 180 degrees in the circumferential direction, and the magnet 33 or the magnet 29 may be arranged such that the angular position Ap1 of the boundary between the N and S poles of the magnet 29 is shifted by approximately 45 degrees from the angular position Ap2 of the circumferential center of any of the magnetic poles of the magnet 33.

If the angular position Ap1 of the boundary between the N and S poles of the magnet 29 is aligned with or close to the angular position Ap2 of the center in the circumferential direction of one of the magnetic poles of the magnet 33, one of the N pole and the S pole of the magnet 29 faces the magnet 33 of the same polarity, and the other faces the magnet 33 of the opposite polarity. In this case, a repulsive force acts at the location where the same poles face each other between the magnet 33 and the magnet 29, and an attractive force acts at the location where the opposite poles face each other, which may cause magnetic interference. According to the encoder 7 of the embodiment, the angular position Ap1 of the boundary between the N pole and the S pole of the magnet 29 is aligned with the angular position Ap2 of the center in the circumferential direction of one of the magnetic poles of the magnet 33 by approximately 45 degrees, thereby reducing the repulsive and attractive forces acting between the magnet 33 and the magnet 29 and reducing the magnetic interference.

In an embodiment, the encoder 7 may have the magnet 29 that is fixed to the hub 17 at a position on the rotation axis Ax, and the magnetic detection unit 27 that is disposed to face the magnet 29 and detects the magnetism of the magnet 29, and the trigger signal generator 31 may generate a trigger signal at a first phase angle based on the detection of the magnetism of the magnet 33 when the hub 17 rotates forward, and generate a trigger signal at a second phase angle based on the detection of the magnetism of the magnet 33 when the hub 17 rotates reversely, and the magnet 29 and the magnetic detection unit 27 may be arranged such that the magnetic detection unit 27 (more specifically, the A-phase multi-rotation signal generation unit 49 and the B-phase multi-rotation signal generation unit 51 of the processing module 43) generates pulsed A-phase multi-rotation signals Ma and B-phase multi-rotation signals Mb that switch between high and low at a third phase angle having a phase difference of a predetermined angle or more with respect to each of the first phase angle and the second phase angle. In this case, when the A-phase multi-rotation signal Ma and the B-phase multi-rotation signal Mb are acquired based on the trigger signal, it is possible to avoid the signals becoming unstable due to acquiring the A-phase multi-rotation signal Ma and the B-phase multi-rotation signal Mb near the timing when they switch between high and low, and it is possible to acquire the A-phase multi-rotation signal Ma and the B-phase multi-rotation signal Mb in a stable state.

In the embodiment, the encoder 7 may have the battery 35 that supplies power to the magnetic detection unit 27 when no external power is supplied, and the trigger signal generator 31 may generate a trigger signal that triggers the supply of power from the battery 35 to the magnetic detection unit 27 based on the detection of the magnetism of the magnet 33. In this case, it is not necessary to install a battery outside the encoder, and the encoder may be implemented without the maintenance of external battery replacement.

In the embodiment, the encoder 7 may include the substrate 21 on which the trigger signal generator 31 is arranged on the surface on the anti-load side, the battery 35 that is disposed on the surface on the anti-load side of the substrate 21 and supplies power to at least a portion of the circuit of the substrate 21 when external power is not supplied to the encoder 7, the connector 37 that is disposed on the surface on the anti-load side of the substrate 21, and the cable 45 that is connected to the connector 37 and routed through the space between the trigger signal generator 31 and the battery 35. In this case, by routing the cable 45 through the space between the trigger signal generator 31 and the battery 35, it is possible to effectively utilize the space between the trigger signal generator 31 and the battery 35, which is relatively high among the circuit components arranged on the substrate 21, and to make the encoder 7 compact. In addition, the length of the cable 45 may be shortened.

7. Modifications

The disclosed embodiment is not limited to the above, and various modifications are possible without departing from the spirit and technical concept of the present disclosure. Such modifications will be described below.

(7-1. When Filling the Gaps Between Magnets with non-magnetic material)

Figure 14:
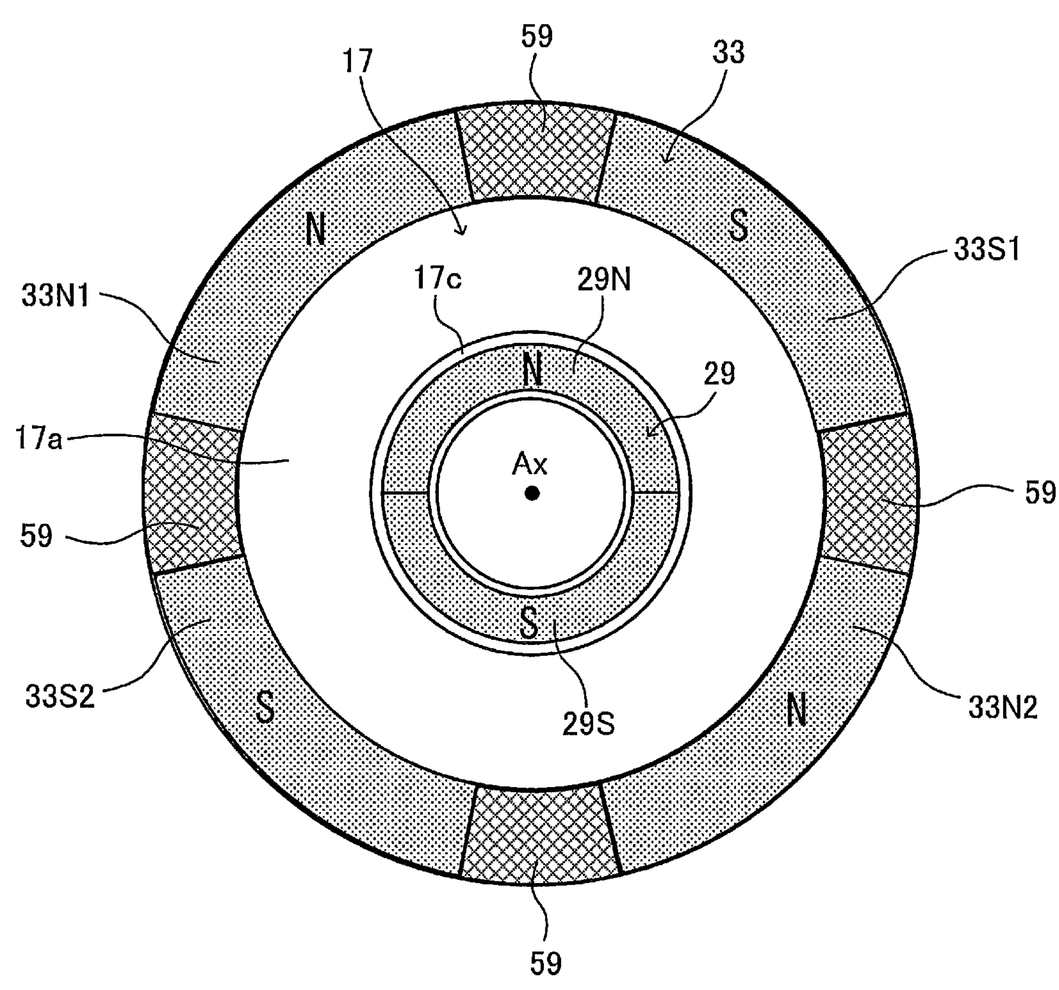
FIG. 14 is a plan view of a hub viewed from the substrate side, illustrating an example of an arrangement of magnets in a modified example in which the gaps between the magnets are filled with a non-magnetic material.

In the embodiment, the magnets 33N1, 33S1, 33N2, and 33S2 of the magnet 33 are arranged with gaps between the magnets in the circumferential direction, but the arrangement of the magnets 33N1, 33S1, 33N2, and 33S2 is not limited thereto. For example, as illustrated in FIG. 14, spacers 59 may be filled to fill the gaps between the magnets 33N1, 33S1, 33N2, and 33S2. The spacers 59 are made of a non-magnetic material.

According to the modification, the spacers 59 may improve the circumferential weight balance of the hub 17 and reduce shaft run-out or vibration when the hub 17 rotates, compared to the case where gaps are provided between the magnets 33N1, 33S1, 33N2, 33S2.

(7-2. When the Hub is Made of a Non-Magnetic Material and the Magnets are Magnetized in the Circumferential Direction)

Figure 15:
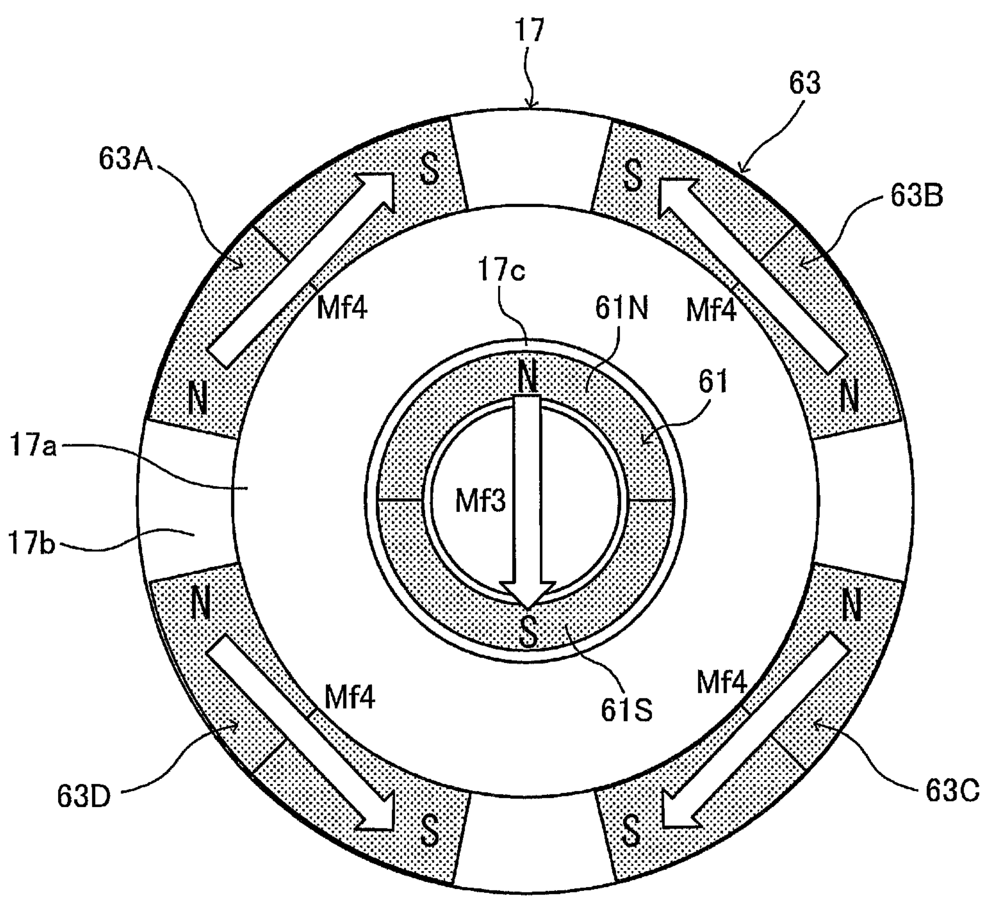
FIG. 15 is a plan view illustrating an example of a flow of magnetic flux caused by magnets in a modified example in which the hub is made of a non-magnetic material and the magnets are magnetized in the circumferential direction.
Figure 16:
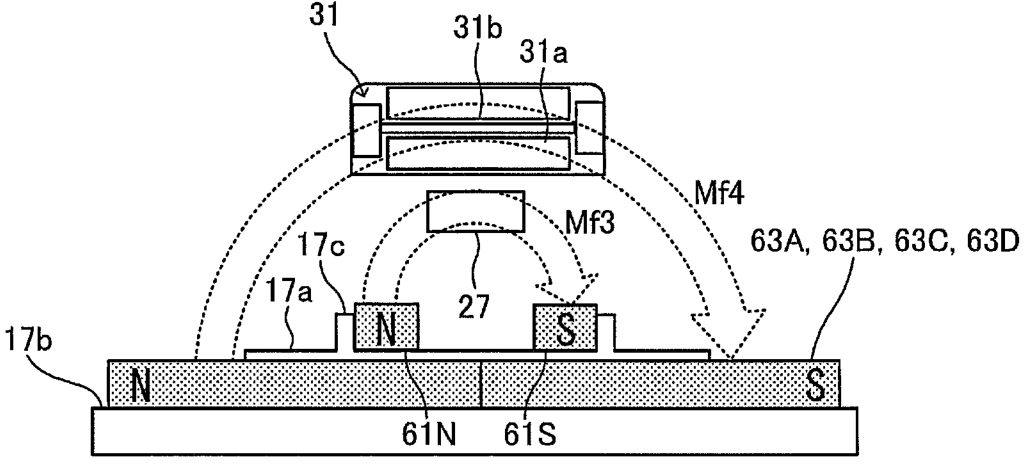
FIG. 16 is a side view illustrating an example of a flow of magnetic flux caused by magnets in a modified example in which the hub is made of a non-magnetic material and the magnets are magnetized in the circumferential direction.

In the embodiment, the hub 17 is made of a magnetic material, and the magnets 29, 33 are magnetized in the axial direction to have magnetic poles in the axial direction, but the magnetization direction of the magnets 29, 33 is not limited to the axial direction. For example, as illustrated in FIGS. 15 and 16, the hub 17 may be made of a non-magnetic material, and the magnets 61, 63 may be magnetized in the circumferential direction to have magnetic poles in the circumferential direction. FIG. 15 is a plan view illustrating an example of the flow of magnetic flux due to the magnets 61, 63, and FIG. 16 is a side view illustrating an example of the flow of magnetic flux due to the magnets 61, 63.

As illustrated in FIGS. 15 and 16, the magnet 61 is magnetized in the circumferential direction, and is configured such that the magnetic poles are alternately switched between the N and S poles every 180 degrees in the circumferential direction. The magnet 61 has a magnetic pole 61N magnetized to the N pole and a magnetic pole 61S magnetized to the S pole. The magnetic flux Mf3 of the magnet 61 is an arc-shaped magnetic flux that exits the magnetic pole 61N, passes through the magnetic detection unit 27, and enters the magnetic pole 61S on the radially inner side of the anti-load side of the hub 17. The magnetic flux Mf3 has a predetermined width that flows from the vicinity of the center of the magnetic pole 61N to the vicinity of the center of the magnetic pole 61S. When the magnet 61 is magnetized in the circumferential direction, if the hub 17 is made of a magnetic material, the arch shape of the magnetic flux Mf3 becomes smaller due to a short circuit of the magnetic path, but if the hub 17 is made of a non-magnetic material, the arch shape of the magnetic flux Mf3 may be made larger, and the magnetic flux Mf3 may easily reach the magnetic detection unit 27.

As illustrated in FIGS. 15 and 16, the magnet 63 has a plurality of magnets (e.g., four magnets) arranged with gaps between each other along the circumferential direction so that each magnet has a magnetic pole at both ends in the circumferential direction and adjacent magnets have magnetic poles facing in the opposite direction. The plurality of magnets includes two magnets 63A and 63C magnetized with an N pole on one circumferential side and an S pole on the other circumferential side, and two magnets 63B and 63D magnetized with an S pole on one circumferential side and an N pole on the other circumferential side, for a total of four magnets. Each of the plurality of magnets 63A, 63B, 63C, and 63D of the magnet 63 has an arc shape.

The magnetic flux Mf4 of the magnet 63 is four arc-shaped magnetic fluxes that exit from the N pole and enter the S pole of each of the magnets 63A, 63B, 63C, and 63D on the radially outer side of the anti-load side of the hub 17. Each magnetic flux Mf4 has a predetermined width and flows from the vicinity of the N pole end of each of the magnets 63A, 63B, 63C, and 63D to the vicinity of the S pole end. Rotation of the hub 17 causes any one of the magnetic fluxes Mf4 to pass through the trigger signal generator 31 and generate a Large Barkhausen effect that reverses the magnetization direction of the magnetic element 31*a*. When the magnet 63 is magnetized in the circumferential direction, if the hub 17 is made of a magnetic material, the arch shape of the magnetic flux Mf4 becomes smaller due to a short circuit of the magnetic path, but if the hub 17 is made of a non-magnetic material, the arch shape of the magnetic flux Mf4 may be made larger, and the magnetic flux Mf4 may easily reach the trigger signal generator 31.

In the modification as well, the magnetic field of the magnet 61 may be detected satisfactorily by the magnetic detection unit 27, and the magnetic field of the magnet 63 may be detected satisfactorily by the trigger signal generator 31.

(7-3. Others)

In the embodiment, descriptions have been made on the case where the encoder 7 has the battery 35, but the various effects described in the above embodiment may be achieved even without the battery 35 in some cases. Therefore, it goes without saying that the scope of the right also includes the case where the encoder 7 does not have the battery 35, depending on the effect to be obtained. Furthermore, in the embodiment, descriptions have been made on the case where the encoder 7 detects the amount of multiple rotations when there is no power supply. Similarly, the various effects described in the above embodiment may also be achieved even with an encoder that does not detect the amount of multiple rotations when there is no power supply. Therefore, it goes without saying that the scope of the right also includes the case where the encoder 7 does not detect the amount of multiple rotations when there is no power supply, depending on the effect to be obtained. Examples of the encoder 7 without the battery 35 include, for example, a case where power is supplied from a battery outside the encoder, a case where a plurality of trigger signal generators 31 is provided and the signals of the multiple rotations are recorded and the amount of multiple rotations is calculated from the signals, and a case where the magnetic detection unit 27 is driven using a signal generated by the trigger signal generator 31 as power, but the present disclosure is not limited to these examples.

In the embodiment, descriptions have been made on the case where the optical module 25 is a reflective optical module, but the optical module 25 may be a transmissive optical module. In this case, for example, the light source 41 and the light receiving arrays PA and PI may be disposed on opposite sides across the disk 19, and the slits of the scales SA and SI may be formed as transmissive slits (e.g., holes) in the disk 19.

In the embodiment, descriptions have been made on the case where one type of incremental pattern is provided on the disk 19, but multiple types of incremental patterns with different pitches may be provided on the disk 19. In this case, it is possible to generate an angular position signal with a higher resolution based on multiple incremental signals with different resolutions.

The problems to be solved by the embodiments and the effects of the embodiments are not limited to those described above. That is, the embodiments may solve problems not described above or achieve effects not described above, or may solve only some of the problems described or achieve only some of the effects described.

In the above description, it is noted that when terms such as "vertical," "parallel," and "plane" are used, the terms are not used in the strict sense. That is, terms such as "vertical," "parallel," and "plane" mean "substantially vertical," "substantially parallel," and "substantially plane," allowing for design and manufacturing tolerances and errors.

In addition, in the above description, when the external dimensions, size, shape, position, etc. are described as "same," "equal," "different," etc., the description does not mean in the strict sense. That is, terms such as "same," "equal," "different" mean "substantially the same," "substantially the same," "substantially equal," or "substantially different," allowing for design and manufacturing tolerances and errors.

From the foregoing, it will be appreciated that various embodiments of the present disclosure have been described herein for purposes of illustration, and that various Modifications may be made without departing from the scope and spirit of the present disclosure. Accordingly, the various embodiments disclosed herein are not intended to be limiting, with the true scope and spirit being indicated by the following claims.

What is claimed is:

1. An encoder comprising:

a rotating body configured to be rotatable around a rotation axis;

a disk fixed to the rotating body and having a scale formed in a ring shape;

an optical module disposed to face the disk and configured to detect the scale;

a first magnet disposed on one side from the disk in a direction of the rotation axis and fixed to the rotating body;

a first magnetic detector disposed on a remaining side from the disk in the direction of the rotation axis and configured to detect magnetism of the first magnet;

the disk is made of a non-magnetic material, the rotating body supports the disk such that the disk covers the remaining side of the first magnet, the first magnetic detector detects the magnetism of the first magnet that has passed through the disk, a gap is formed between the disk and the first magnet in the direction of the rotation axis, the first magnet includes a plurality of sub-magnets arranged with a gap between each other along a circumferential direction around the rotation axis such that each of the plurality of sub-magnets has a magnetic pole in the direction of the rotation axis and adjacent sub-magnets have different magnetic poles, each of the plurality of sub-magnets included in the first magnet has an arc shape, and the first magnetic detector is disposed such that a center of the first magnetic detector is located radially inward from a rotation trajectory of the plurality of sub-magnets that is generated by rotation of the rotating body in a radial direction around the rotation axis.

2. The encoder according to claim 1, wherein the rotating body is made of a magnetic material and is formed to cover the one side of the first magnet.

3. The encoder according to claim 2, wherein the rotating body includes an inner peripheral portion located on an inner peripheral side in the radial direction around the rotation axis; and an outer peripheral portion located on an outer peripheral side in the radial direction from the inner peripheral portion, and has a thickness thinner in the direction of the rotation axis than that of the inner peripheral portion, the disk is disposed on the remaining side of the inner peripheral portion, and the first magnet is disposed on the remaining side of the outer peripheral portion.

4. The encoder according to claim 3, wherein the rotating body has a surface on the remaining side of the inner peripheral portion that protrudes toward the remaining side more than a surface on the remaining side of the first magnet disposed in the outer peripheral portion, and the disk protrudes toward the outer peripheral side from the inner peripheral portion in the radial direction.

5. The encoder according to claim 3, wherein an outer diameter of the inner peripheral portion in the radial direction is smaller than an inner diameter of the scale in the radial direction.

6. A servo motor comprising:

a motor in which a rotator rotates with respect to a stator; and the encoder of claim 1 that detects at least one of position, speed, and acceleration of the rotator.

7. A servo system comprising:

a motor in which a rotator rotates with respect to a stator;

the encoder of claim 1 that detects at least one of position, speed, and acceleration of the rotator; and a control device that controls the motor based on detection results of the encoder.

8. An encoder comprising:

a rotating body configured to be rotatable around a rotation axis;

a disk fixed to the rotating body and having a scale formed in a ring shape;

an optical module disposed to face the disk and configured to detect the scale;

a first magnet disposed on one side from the disk in a direction of the rotation axis and fixed to the rotating body;

a first magnetic detector disposed on a remaining side from the disk in the direction of the rotation axis and configured to detect magnetism of the first magnet;

a second magnet fixed to the rotating body at a position on the rotational axis; and a second magnetic detector disposed to face the second magnet and configured to detect magnetism of the second magnet, wherein the rotating body supports the first magnet such that the first magnet is disposed on an outer peripheral side from the second magnet in the radial direction centered on the rotation axis.

9. The encoder according to claim 8, wherein the rotating body is made of a magnetic material, and has a magnet accommodating portion that accommodates the second magnet with a wall protruding toward the second magnetic detector along an outer peripheral shape of the second magnet.

10. The encoder according to claim 8, wherein the first magnet is configured such that N and S poles alternately switch every 90 degrees in the circumferential direction around the rotation axis, the second magnet is configured such that N and S poles alternately switch every 180 degrees in the circumferential direction, and the first magnet or the second magnet is arranged such that an angular position of a boundary between the N and S poles in the second magnet is shifted by about 45 degrees from an angular position of a center of any of the magnetic poles of the first magnet in the circumferential direction.

11. The encoder according to claim 1, further comprising:

a second magnet fixed to the rotating body at a position on the rotational axis; and a second magnetic detector disposed to face the second magnet and configured to detect magnetism of the second magnet, wherein the first magnetic detector generates a first electrical signal at a first phase angle based on detection of the magnetism of the first magnet when the rotating body rotates in a first direction, and generates a first electrical signal at a second phase angle based on the detection of the magnetism of the first magnet when the rotating body rotates in a second direction opposite to the first direction, and the second magnet and the second magnetic detector are arranged such that the second magnetic detector generates a pulsed second electrical signal that switches between high and low at a third phase angle having a phase difference of a predetermined angle or more relative to each of the first phase angle and the second phase angle.

12. The encoder according to claim 11, further comprising:

a battery configured to supply power to the second magnetic detector when external power is not supplied to the encoder, wherein the first magnetic detector generates the first electric signal that serves as a trigger for supplying power of the battery to the second magnetic detector, based on the detection of the magnetism of the first magnet.

13. An encoder comprising:

a rotating body configured to be rotatable around a rotation axis;

a disk fixed to the rotating body and having a scale formed in a ring shape;

an optical module disposed to face the disk and configured to detect the scale;

a first magnet disposed on one side from the disk in a direction of the rotation axis and fixed to the rotating body;

a first magnetic detector disposed on a remaining side from the disk in the direction of the rotation axis and configured to detect magnetism of the first magnet;

a substrate with the first magnetic detector being disposed on a surface of the substrate on the remaining side thereof;

a battery disposed on the surface of the substrate on the remaining side and configured to supply power to at least a portion of circuits of the substrate when external power is not supplied to the encoder;

a connector disposed on the surface of the substrate on the remaining side; and a cable connected to the connector and routed through a space between the first magnetic detector and the battery.

* * * * *